US010326907B2

(12) United States Patent
Fukui et al.

(10) Patent No.: US 10,326,907 B2
(45) Date of Patent: Jun. 18, 2019

(54) IMAGE PROCESSING APPARATUS AND IMAGE PROCESSING METHOD FOR A PRINTING APPARATUS

(71) Applicant: SCREEN HOLDINGS CO., LTD., Kyoto (JP)

(72) Inventors: Kazuki Fukui, Kyoto (JP); Katsuyuki Hisaoka, Kyoto (JP); Kunio Muraji, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/964,547

(22) Filed: Apr. 27, 2018

(65) Prior Publication Data
US 2018/0316824 A1 Nov. 1, 2018

Related U.S. Application Data

(62) Division of application No. 15/384,468, filed on Dec. 20, 2016, now Pat. No. 9,986,127.

(30) Foreign Application Priority Data

Dec. 25, 2015 (JP) ................. 2015-253818

(51) Int. Cl.
B41J 2/21 (2006.01)
H04N 1/38 (2006.01)
(Continued)

(52) U.S. Cl.
CPC ............ H04N 1/3878 (2013.01); B41J 3/543 (2013.01); B41J 11/008 (2013.01); B41J 13/32 (2013.01);
(Continued)

(58) Field of Classification Search
CPC ...... B41J 2/2135; B41J 2/2054; B41J 2/2132; B41J 2/2146; B41J 11/008; B41J 3/543; B41J 13/32; H04N 1/3878; G06K 15/102
See application file for complete search history.

(56) References Cited

U.S. PATENT DOCUMENTS

2011/0285778 A1 11/2011 Ishikawa
2011/0298853 A1* 12/2011 Takamiya ............... B41J 2/2135
347/13

(Continued)

FOREIGN PATENT DOCUMENTS

JP 2013-176868 A 9/2013

OTHER PUBLICATIONS

Notice of Allowance issued in U.S. Appl. No. 15/384,468 dated Feb. 1, 2018.

Primary Examiner — Jason S Uhlenhake
(74) Attorney, Agent, or Firm — McDermott Will & Emery LLP

(57) ABSTRACT

An image processing apparatus for a printing apparatus. The image processing apparatus includes a recording position acquiring device for acquiring recording positions of a reference image printed by a reference print head and a target image printed by a target print head, a positional deviation amount calculating device for calculating a deviation amount due to a skew with respect to the recording positions of the reference image and the target image, and a positional deviation interpolation image converting device, when there is a remainder of the deviation amount and the predetermined intervals, for adding a weight based on the remainder, and adding a smaller weight than the weight to the reference image or the target image without a remainder and adjoining the reference image or the target image with (Continued)

the remainder, thereby converting the image into a width direction positional deviation interpolation image.

10 Claims, 21 Drawing Sheets

(51) Int. Cl.
*H04N 13/32* (2018.01)
*G06K 15/10* (2006.01)
*H04N 1/387* (2006.01)
*B41J 13/32* (2006.01)
*H04N 1/00* (2006.01)
*H04N 1/405* (2006.01)
*B41J 3/54* (2006.01)
*B41J 11/00* (2006.01)
*H04N 1/52* (2006.01)
*B41J 15/04* (2006.01)

(52) U.S. Cl.
CPC ....... *G06K 15/102* (2013.01); *H04N 1/00665* (2013.01); *H04N 1/00718* (2013.01); *H04N 1/405* (2013.01); *H04N 1/52* (2013.01); *B41J 15/04* (2013.01)

(56) References Cited

U.S. PATENT DOCUMENTS

2013/0222459 A1   8/2013  Hisaoka et al.
2013/0235108 A1*  9/2013  Mizuno .................. B41J 2/205
                                                       347/15

\* cited by examiner

Fig.3
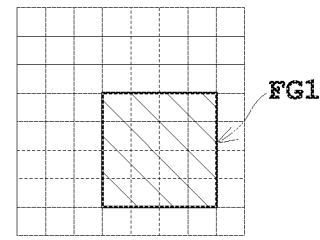
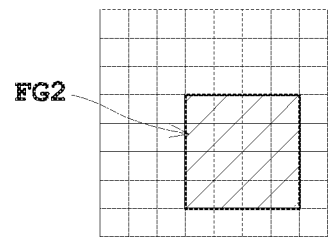
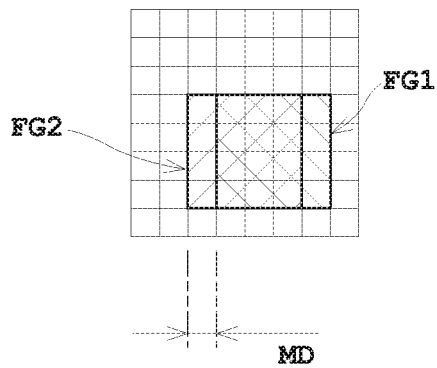

Fig.9

| | LARGE DROPLET SIZE HALFTONE DATA |
| | MEDIUM DROPLET SIZE HALFTONE DATA |
| | SMALL DROPLET SIZE HALFTONE DATA |

Large droplet size halftone data:
| | | | | |
|---|---|---|---|---|
| | | | | |
| 130 | 120 | | | |
| | | 115 | | |
| | 120 | | | |
| | | | | 130 |

Medium droplet size halftone data:
| | | | | |
|---|---|---|---|---|
| | | | 70 | |
| 80 | | 70 | | |
| | | | 90 | |
| | 70 | | | |
| 90 | | | | 80 |

Small droplet size halftone data:
| | | | | |
|---|---|---|---|---|
| | 25 | | 20 | 25 |
| 20 | | 20 | | |
| | | | 25 | 25 |
| | 20 | | | |
| 25 | 20 | | 20 | 20 |

REAL DATA — FG2

| 170 | 100 | 28 | 2 | 0 |
|---|---|---|---|---|
| 170 | 100 | 28 | 2 | 0 |
| 170 | 100 | 28 | 2 | 0 |
| 170 | 100 | 28 | 2 | 0 |
| 170 | 100 | 28 | 2 | 0 |

AFTER HALFTONE DOT PROCESS — hFG2

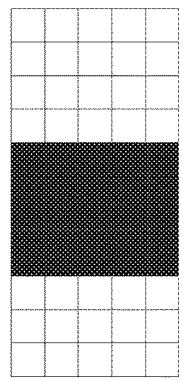 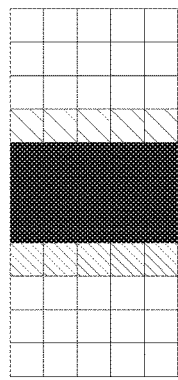 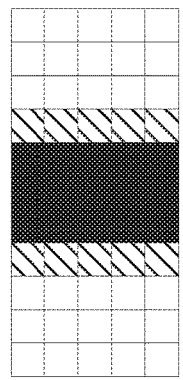 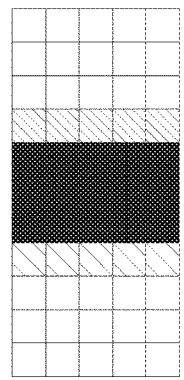 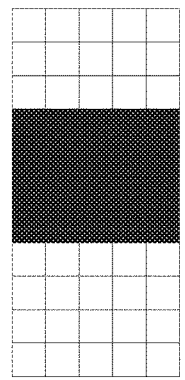
Fig.11B REFERENCE EXAMPLE
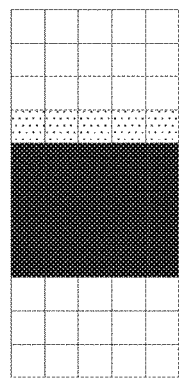 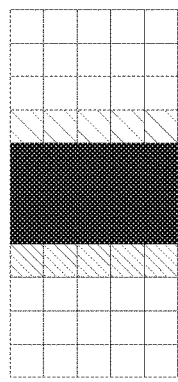 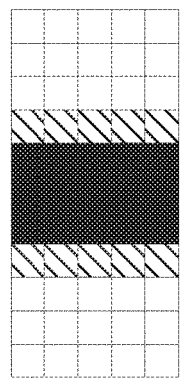 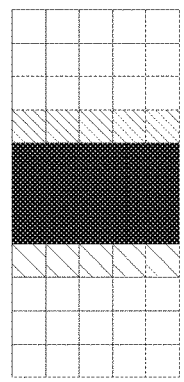 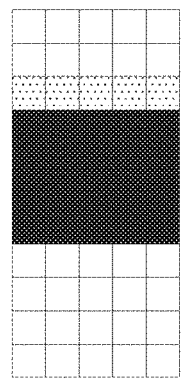
Fig.11A THIS EMBODIMENT
0      1/4      1/2      3/4      1

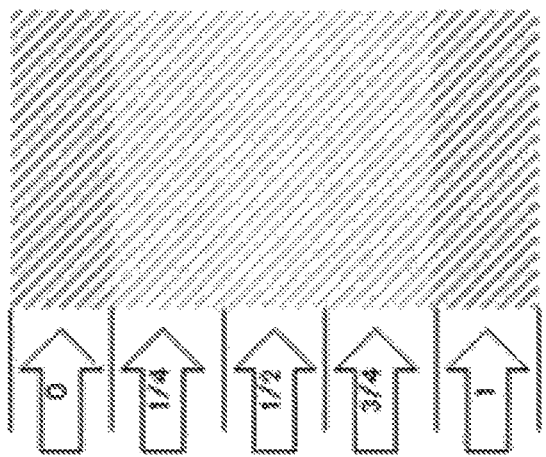
Fig.12A  THIS EMBODIMENT
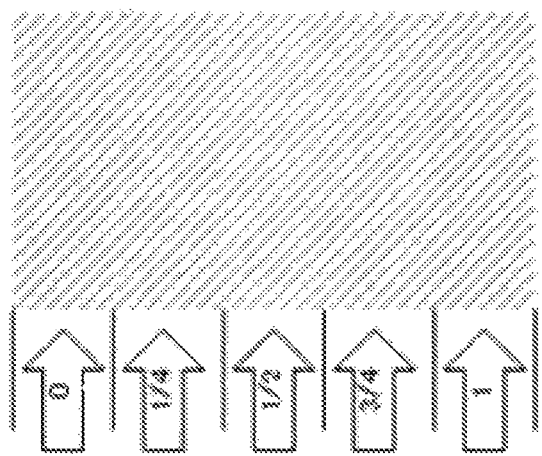
Fig.12B  REFERENCE EXAMPLE

Fig. 13A THIS EMBODIMENT (SINC FUNCTION)
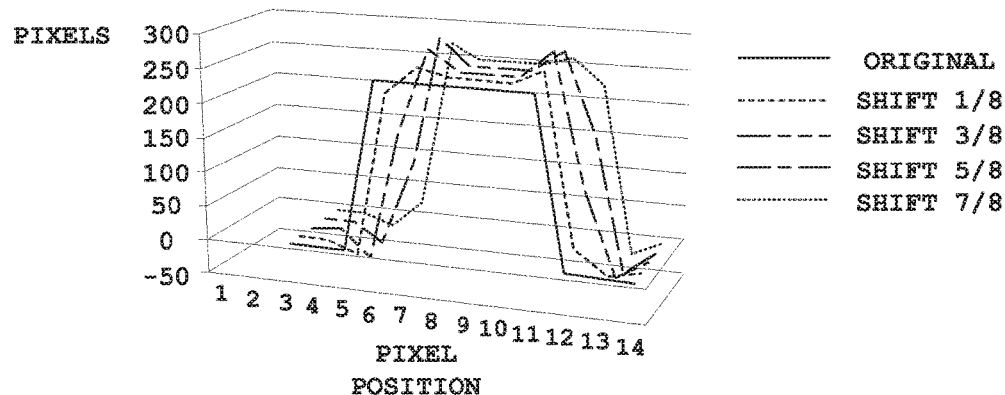
Fig. 12A
Fig. 13B THIS EMBODIMENT (EXPONENTIAL FUNCTION)
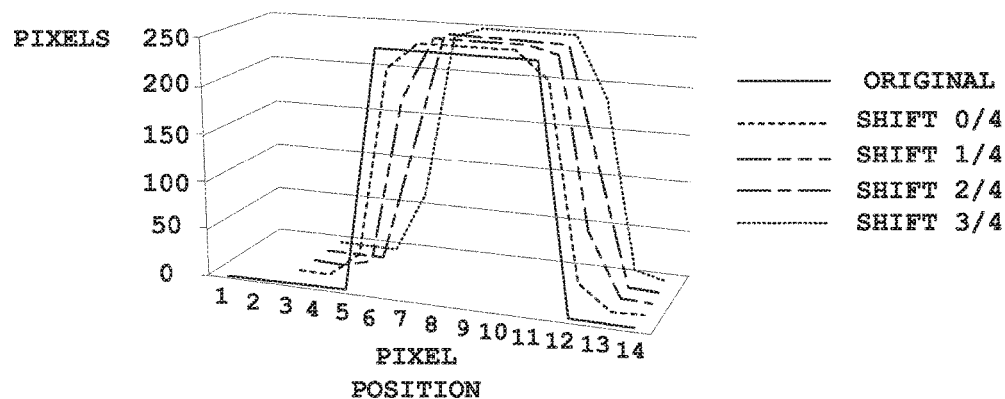
Fig. 13C REFERENCE EXAMPLE
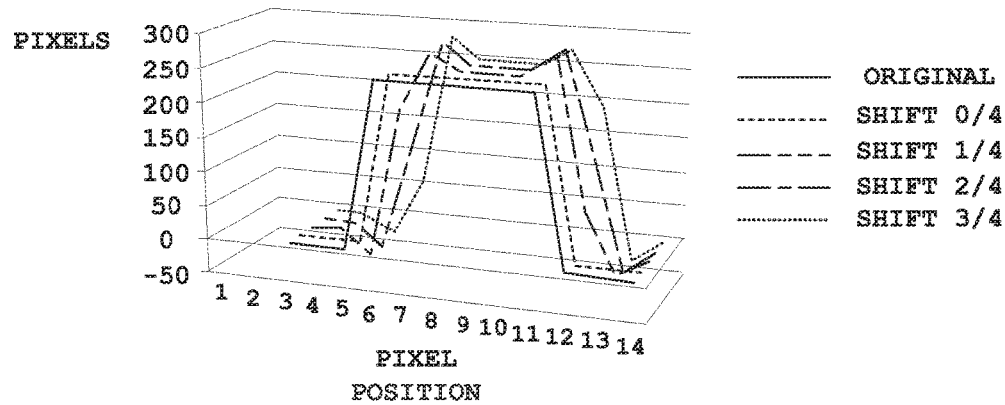

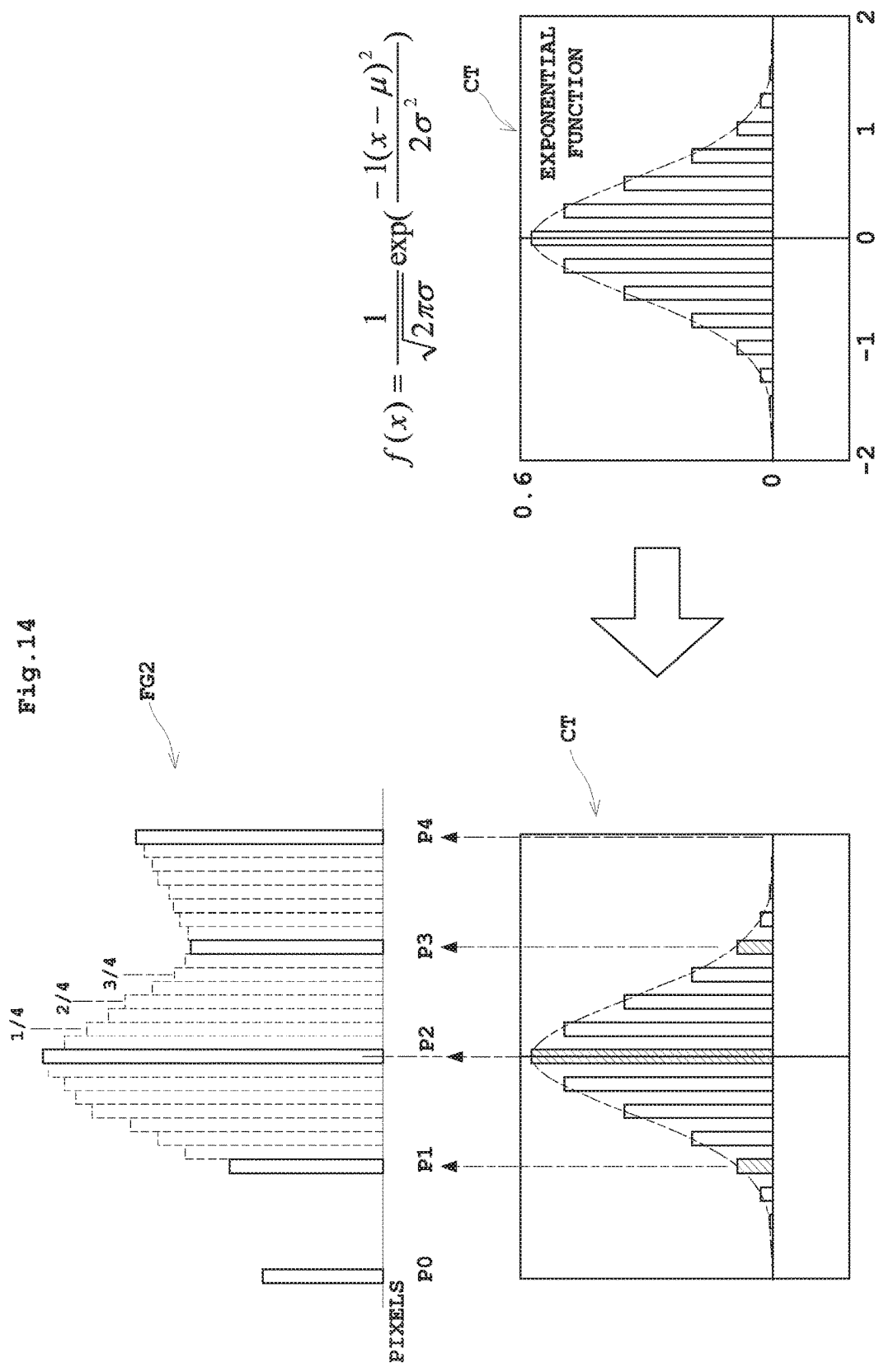

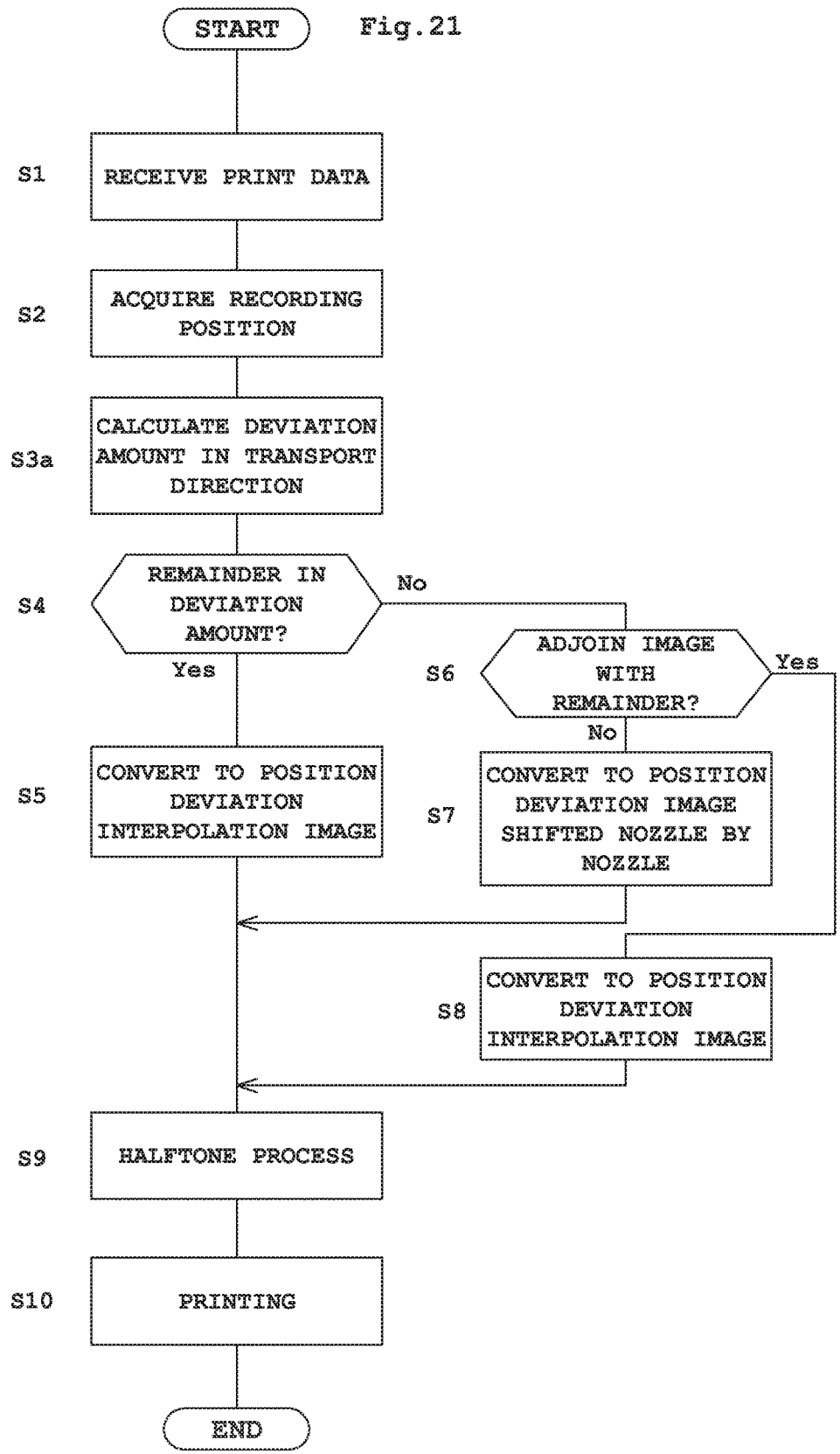

IMAGE PROCESSING APPARATUS AND IMAGE PROCESSING METHOD FOR A PRINTING APPARATUS

CROSS-REFERENCE TO RELATED APPLICATIONS

This application is a divisional of U.S. patent application Ser. No. 15/384,468, filed Dec. 20, 2016 which claims the benefit of Japanese Patent Application No. 2015-253818, filed Dec. 25, 2015 the entire contents of each are incorporated herein by reference.

BACKGROUND OF THE INVENTION

(1) Field of the Invention

This invention relates to an image processing apparatus and an image processing method for a printing apparatus having at least two print heads spaced from each other in a transport direction of a printing medium. The image processing apparatus and image processing method are provided for processing print data to be printed by the printing apparatus.

(2) Description of the Related Art

Conventionally, as this type of apparatus there exists an inkjet printing apparatus including a transport path for transporting web paper, a printing unit disposed on the transport path for dispensing ink droplets to the web paper to form images thereon, and an image processing apparatus for outputting print data to the printing unit (see Japanese Unexamined Patent Publication No. 2013-176868, for example). In this apparatus, the printing unit includes three print heads arranged at intervals in a transport direction of web paper.

In the inkjet printing apparatus of such construction, when the web paper is transported along the transport path, the web paper may make a skew. When printing is done in this condition, the positional relationship between ink droplets dispensed from an upstream print head and ink droplets dispensed from a downstream print head will produce a positional deviation (also called a misregister), which is a deviation from a positional relationship intended in image data. Then, the image processing apparatus carries out a correction by shifting the image data in a width direction of the web paper according to an amount of skew, and outputs corrected image data to the printing unit. And the printing unit performs printing based on the corrected image data.

However, the conventional example having such construction has the following problems.

The conventional apparatus carries out a shifting process according to an amount of skew on a nozzle-by-nozzle basis which is a recording limit of the printing unit. It is therefore impossible to perform a sufficient correction, depending on an amount of skew which does not make an integral multiple of nozzle interval, thereby failing to fully inhibit a positional deviation. A failure to fully inhibit the positional deviation will cause a lowering of print quality. Thus, the inhibiting of the positional deviation is a serious issue.

A similar problem may arise from a cause different from the above skewing. That is, the above inkjet printing apparatus uses a rotary encoder attached to a transport roller to detect a transport speed of the web paper, and adjusts the timing of dispensing ink droplets according to the transport speed and a distance between the print heads. However, the transport roller may expand in the circumferential direction due to heat, for example. In such a state, the transport speed, although constant, will be detected in error, resulting in a positional deviation in the transport direction. In this case also, as in the case of skew, the shifting process on the nozzle-by-nozzle basis which is the recording limit may prove insufficient.

SUMMARY OF THE INVENTION

This invention has been made having regard to the state of the art noted above, and its object is to provide an image processing apparatus and an image processing method for a printing apparatus which can inhibit an apparent positional deviation through devised image processing.

To fulfill the above object, this invention provides the following construction.

An image processing apparatus, according to this invention, for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium, the image processing apparatus comprising a recording position acquiring device for acquiring recording positions of a reference image printed by the reference print head and a target image printed by the target print head; a positional deviation amount calculating device for calculating a deviation amount due to a skew of the printing medium with respect to the recording positions of the reference image and the target image acquired by the recording position acquiring device; and a positional deviation interpolation image converting device, when there is a remainder of the deviation amount and the predetermined intervals, for adding a weight based on the remainder to the reference image or the target image, and adding a smaller weight than said weight to the reference image or the target image without a remainder and adjoining the reference image or the target image with the remainder, thereby converting the image into a width direction positional deviation interpolation image shifted according to the skew of the printing medium.

According to this invention, the positional deviation amount calculating device calculates a deviation amount due to a skew of the printing medium with respect to the recording positions of the reference image and the target image acquired by the recording position acquiring device. The positional deviation interpolation image converting device, when there is a remainder from a division of the deviation amount by the predetermined intervals, adds a weight based on the remainder to the reference image or the target image. Further, the positional deviation interpolation image converting device adds a smaller weight than the weight to the reference image or the target image without a remainder and adjoining the reference image or the target image with the remainder, thereby converting the image into a positional deviation interpolation image shifted according to the skew of the printing medium. Since a weighting is carried out according to the remainder to make a positional deviation interpolation image, apparent positional deviations can fully be inhibited whatever the amount of skew. Of the images with no remainder which essentially do not need to be shifted, an image adjoining an image to which weighting has been applied is converted into a positional deviation interpolation image with a small weighting. Consequently, boundaries are made inconspicuous, and a lowering of print quality can be inhibited even when the positional deviation interpolation image is used.

In another aspect of this invention, there is provided an image processing apparatus for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium and in the transport direction of the printing medium, the image processing apparatus comprising a pulse signal outputting device for outputting a pulse signal according to rotation of a transport roller rotatable with movement of the recording medium; a recording position acquiring device for acquiring recording positions of a reference image printed by the reference print head and a target image printed by the target print head; a positional deviation amount calculating device for calculating a deviation amount in the transport direction due to a variation of the pulse signal detected by the pulse signal outputting device with respect to the recording positions of the reference image and the target image acquired by the recording position acquiring device; and a positional deviation interpolation image converting device, when there is a remainder of the deviation amount and the predetermined intervals in the transport direction, for adding a weight based on the remainder to the reference image or the target image, and adding a smaller weight than said weight to the reference image or the target image without a remainder and adjoining the reference image or the target image with the remainder, thereby converting the image into a positional deviation interpolation image shifted according to the variation of the pulse signal.

According to this invention, the positional deviation amount calculating device calculates a deviation amount in the transport direction due to a variation of the pulse signal detected by the pulse signal outputting device with respect to the recording positions of the reference image and the target image acquired by the recording position acquiring device. The positional deviation interpolation image converting device, when there is a remainder from a division of the deviation amount by the predetermined intervals, adds a weight based on the remainder to the reference image or the target image. Further, the positional deviation interpolation image converting device adds a smaller weight than the weight to the reference image or the target image without a remainder and adjoining the reference image or the target image with the remainder, thereby converting the image into a positional deviation interpolation image shifted according to the variation of the pulse signal. Since a weighting is carried out according to the remainder to make a positional deviation interpolation image, apparent positional deviations can fully be inhibited whatever the deviation amount in the transport direction. Of the images with no remainder which essentially do not need to be shifted, an image adjoining an image to which weighting has been applied is converted into a positional deviation interpolation image with a small weighting. Consequently, boundaries are made inconspicuous, and a lowering of print quality can be inhibited even when the positional deviation interpolation image is used.

In this invention, it is preferred that the positional deviation interpolation image converting device uses a Sin c window function whose minimum value is minus and maximum value is 1 in an interval including a predetermined number of pixels of the reference image or the target image, divides an interval between the pixels of the reference image or the target image by a predetermined number of divisions, and adds the weight and the small weight after further shifting a center of the Sin c window function by a position of a minimum unit of the number of divisions from a position corresponding to the remainder.

The weighting and small weighting can be carried out relatively easily by shifting the Sin c window function according to the remainder.

In this invention, it is preferred that the positional deviation interpolation image converting device uses an exponential window function whose minimum value is 0 and maximum value is less than 1 in an interval including a predetermined number of pixels of the reference image or the target image, divides an interval between the pixels of the reference image or the target image by a predetermined number of divisions, and adds the weight and the small weight after placing a center of the exponential window function in a position corresponding to the remainder.

The weighting and small weighting can be carried out relatively easily by shifting the exponential window function according to the remainder. Since the minimum value of the exponential window function is 0, excellent continuity with adjacent images is secured.

In this invention, it is preferred that the image processing apparatus further comprises a halftone dot processing device for carrying out a halftone dot process according to shift amounts on the positional deviation interpolation image when outputting the positional deviation interpolation image to the printing unit.

With the halftone dot processing device carrying out a halftone dot process on the positional deviation interpolation image, the plurality of recording elements of the printing unit can print the positional deviation interpolation image.

In this invention, it is preferred that the positional deviation interpolation image converting device does not convert line drawing areas of the reference image and the target image into positional deviation interpolation images.

Since the line drawing areas such as characters and a QR code (registered trademark) are not converted into positional deviation interpolation images, outlines can remain clear. The line drawings can therefore be recognized reliably.

In a further aspect of this invention, there is provided an image processing method for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium, the method comprising a recording position acquiring step for acquiring recording positions of a reference image printed by the reference print head and a target image printed by the target print head; a positional deviation amount calculating step for calculating a deviation amount due to a skew of the printing medium with respect to the recording positions of the reference image and the target image acquired in the recording position acquiring step; and a positional deviation interpolation image converting step, when there is a remainder of the deviation amount and the predetermined intervals, for adding a weight based on the remainder to the reference image or the target image, and adding a smaller weight than said weight to the reference image or the target image without a remainder and adjoining the reference image or the target image with the remainder, thereby converting the image into a width direction positional deviation interpolation image shifted according to the skew of the printing medium.

According to this invention, the positional deviation amount calculating step calculates a deviation amount due to a skew of the printing medium with respect to the recording positions of the reference image and the target image acquired in the recording position acquiring step. The positional deviation interpolation image converting step, when there is a remainder from a division of the deviation amount by the predetermined intervals, adds a weight based on the remainder to the reference image or the target image. Further, the positional deviation interpolation image converting step adds a smaller weight than the weight to the reference image or the target image without a remainder and adjoining the reference image or the target image with the remainder, thereby converting the image into a positional deviation interpolation image shifted according to the skew of the printing medium. Since a weighting is carried out according to the remainder to make a positional deviation interpolation image, apparent positional deviations can fully be inhibited whatever the amount of skew. Of the images with no remainder which essentially do not need to be shifted, an image adjoining an image to which weighting has been applied is converted into a positional deviation interpolation image with a small weighting. Consequently, boundaries are made inconspicuous, and a lowering of print quality can be inhibited even when the positional deviation interpolation image is used.

In a still further aspect of this invention, there is provided an image processing method for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium and in the transport direction of the printing medium, the method comprising a pulse signal detecting step for detecting a pulse signal according to rotation of a transport roller rotatable with movement of the recording medium; a recording position acquiring step for acquiring recording positions of a reference image printed by the reference print head and a target image printed by the target print head; a positional deviation amount calculating step for calculating a deviation amount due to a variation of the pulse signal detected in the pulse signal detecting step with respect to the recording positions of the reference image and the target image acquired in the recording position acquiring step; and a positional deviation interpolation image converting step, when there is a remainder of the deviation amount and the predetermined intervals in the transport direction, for adding a weight based on the remainder to the reference image or the target image, and adding a smaller weight than said weight to the reference image or the target image without a remainder and adjoining the reference image or the target image with the remainder, thereby converting the image into a positional deviation interpolation image shifted according to the variation of the pulse signal.

According to this invention, the positional deviation amount calculating step calculates a deviation amount in the transport direction due to a variation of the pulse signal detected in the pulse signal detecting step with respect to the recording positions of the reference image and the target image acquired in the recording position acquiring step. The positional deviation interpolation image converting step, when there is a remainder from a division of the deviation amount by the predetermined intervals, adds a weight based on the remainder to the reference image or the target image. Further, the positional deviation interpolation image converting step adds a smaller weight than the weight to the reference image or the target image without a remainder and adjoining the reference image or the target image with the remainder, thereby converting the image into a positional deviation interpolation image shifted according to the variation of the pulse signal. Since a weighting is carried out according to the remainder to make a positional deviation interpolation image, apparent positional deviations can fully be inhibited whatever the deviation amount in the transport direction. Of the images with no remainder which essentially do not need to be shifted, an image adjoining an image to which weighting has been applied is converted into a positional deviation interpolation image with a small weighting. Consequently, boundaries are made inconspicuous, and a lowering of print quality can be inhibited even when the positional deviation interpolation image is used.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 3 is a view illustrating a positional deviation in a width direction due to a skew:

FIG. 9 is a view illustrating a halftone dot process performed on a real data image;

FIGS. 11A-11B are schematic views of positional deviation interpolation images, in which FIG. 11A shows an embodiment of this invention, and FIG. 11B shows a reference example;

FIGS. 12A-12B show examples of printing result, in which FIG. 12A shows this embodiment, and FIG. 12B shows a reference example;

FIGS. 13A-13C are graphs showing variations of pixel values in images of no-shift real data and in images of various shift amounts, in which FIG. 13A shows this embodiment, FIG. 13B shows an example of exponential function, and FIG. 13C shows a reference example;

FIG. 14 is a schematic view illustrating a weighting process with an exponential function;

FIG. 21 is a flow chart showing a printing process based on an amount of deviation in the transport direction.

DESCRIPTION OF THE PREFERRED EMBODIMENTS

An embodiment of this invention will be described hereinafter with reference to the drawings.

Figure 1:
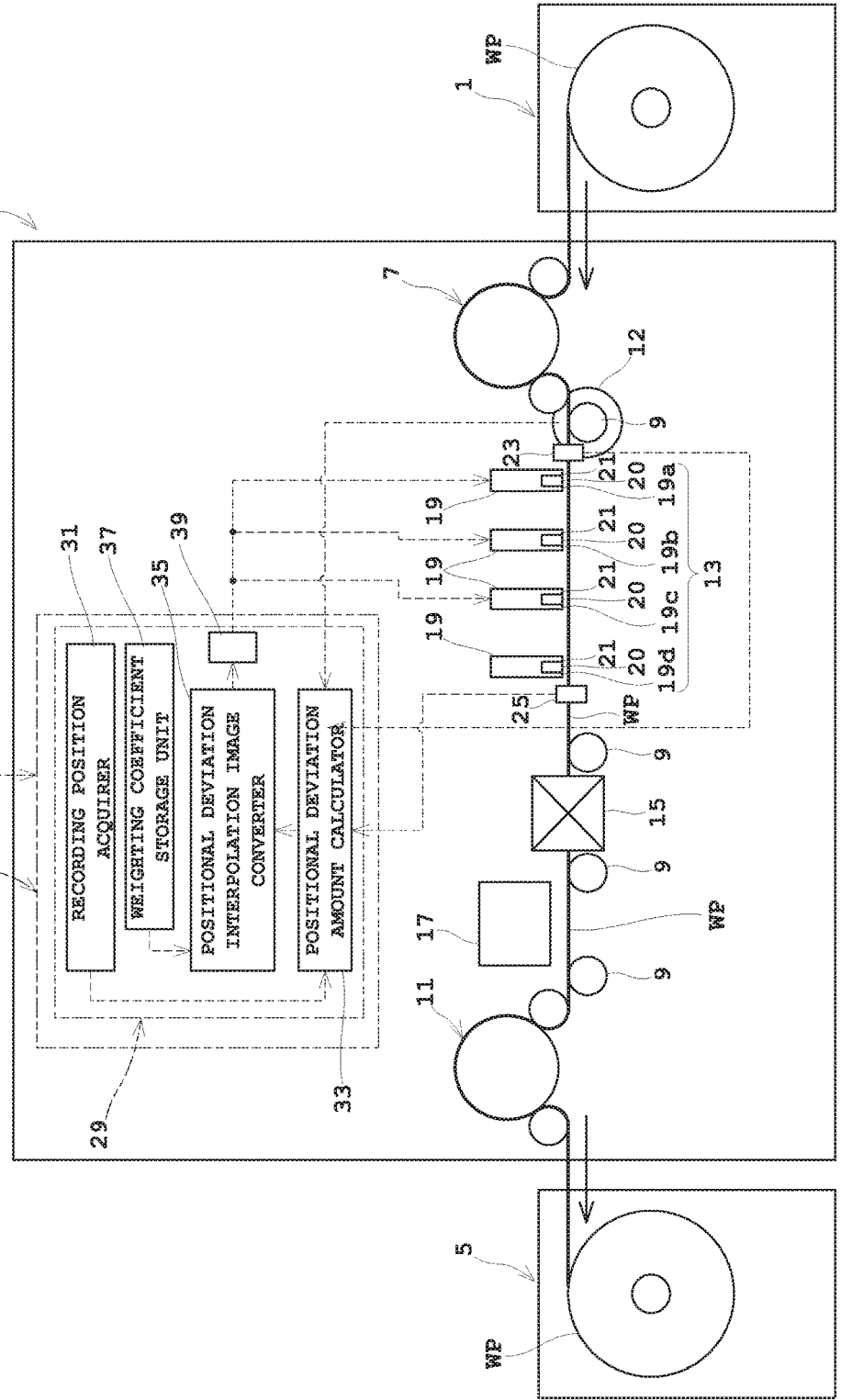
FIG. 1 is a schematic view showing an entire inkjet printing system according to this invention.
Figure 2:
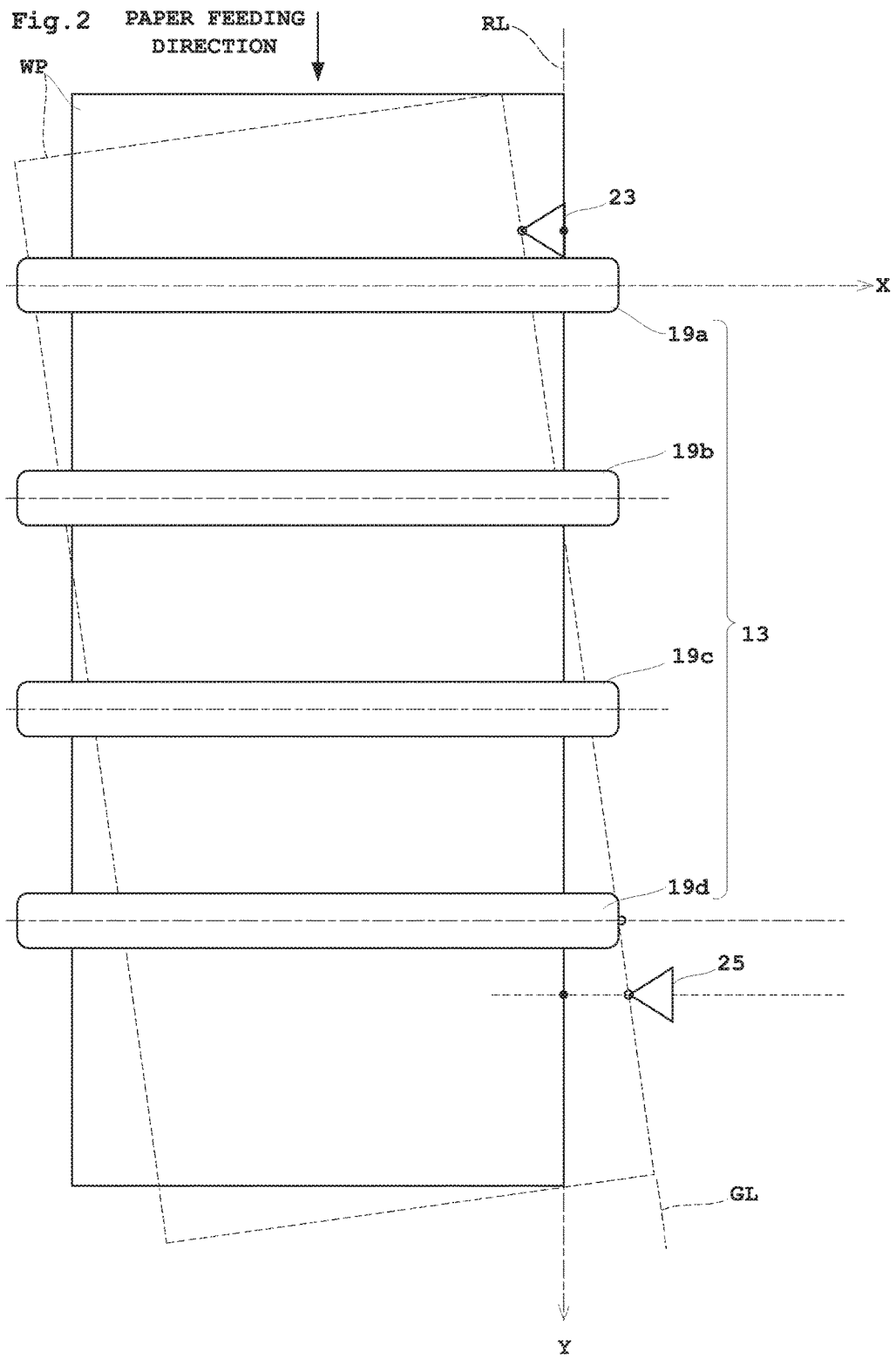
FIG. 2 is a schematic plan view showing a positional relationship between each print head and sensors.

FIG. 1 is a schematic view showing an entire inkjet printing system according to this invention. FIG. 2 is a schematic plan view showing a positional relationship between each print head and sensors.

The inkjet printing system according to this invention includes a paper feeder 1, an inkjet printing apparatus 3 and a takeup roller 5.

The paper feeder 1 holds elongate web paper WP in a roll form to be rotatable about a horizontal axis, and unwinds the web paper WP and feeds it to the inkjet printing apparatus 3. The takeup roller 5 winds up the web paper WP printed by the inkjet printing apparatus 3 about a horizontal axis. Regarding the side from which the web paper WP is fed as upstream and the side to which the web paper WP is discharged as downstream, the paper feeder 1 is disposed upstream of the inkjet printing apparatus 3 while the takeup roller 5 is disposed downstream of the inkjet printing apparatus 3.

The inkjet printing apparatus 3 includes a drive roller 7 disposed in an upstream position for taking in the web paper WP fed from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5. Among the plurality of transport rollers 9, a transport roller 9 disposed between the drive roller 7 and a printing unit 13 described hereinafter has a rotary encoder 12 attached thereto. This rotary encoder 12 outputs a pulse signal corresponding to a rotating speed of the transport roller 9.

The above inkjet printing apparatus 3 corresponds to the "printing apparatus" in this invention. The web paper WP corresponds to the "printing medium" and the "medium" in this invention. The rotary encoder 12 corresponds to the "pulse signal outputting device" in this invention.

The inkjet printing apparatus 3 has the printing unit 13, a drying unit 15 and an inspecting unit 17 arranged in the stated order from upstream between the drive roller 7 and drive roller 11. The drying unit 15 dries portions printed by the printing unit 13. The inspecting unit 17 checks whether the printed portions have stains, omissions or other defects.

The printing unit 13 has a plurality of print heads 19 arranged along the transport direction of web paper WP. It is assumed that this embodiment provides four print heads 19, for example. Each print head 19 dispenses ink droplets toward the web paper WP.

In this embodiment, each print head 19 is called print head 19a, print head 19b, print head 19c or print head 19d in order from upstream. In the following description, when the four print heads 19 need to be individually distinguished, small letters of the alphabet are affixed to the print head 19, but when it is not necessary to distinguish them, only the print head(s) 19 will be used.

The print heads 19 are arranged at predetermined intervals in the transport direction of web paper WP. Each of the first print head 19a, second print head 19b, third print head 19c and fourth print head 19d includes a nozzle portion 21 having a plurality of inkjet nozzles 20 for dispensing ink droplets.

These print heads 19a-19d dispense ink droplets of at least two colors to be capable of multicolor printing on the web paper WP. For example, the print head 19a is for black (K), the print head 19b for cyan (C), the print head 19c for magenta (M), and the print head 19d for yellow (Y). Each nozzle portion 21 has a plurality of inkjet nozzles 20 also in a direction (the depth direction from the plane of FIG. 1) perpendicular to the transport direction of web paper WP as well as a plurality of inkjet nozzles 20 arranged in the transport direction of web paper WP. In this embodiment, a plurality of inkjet nozzles 20 are arranged at predetermined intervals L when seen in the transport direction of web paper WP, and are arranged at the predetermined intervals L also when seen in the direction perpendicular to the transport direction of web paper WP. Specifically, for example, each predetermined interval L=21 μm, which enables printing at a resolution of 1200 dpi. Assuming, for example, that a control target of positional deviation in prints is about 35 μm, the deviation can be fully controlled within the control target if correction is made in units of about 5 μm corresponding to about one fourth of the predetermined interval L.

The plurality of inkjet nozzles 20 noted above correspond to the "plurality of recording elements" in this invention.

A first sensor 23 is disposed upstream of the printing unit 13, and a second sensor 25 downstream of the printing unit 13. These first sensor 23 and second sensor 25 are arranged at an end in a width direction of the transport path of web paper WP for detecting positions in the width direction of a side end surface of the web paper WP. The first sensor 23 and second sensor 25 detect skewing, and a degree of skew, of the side end surface of the web paper WP relative to a reference line which is a transport line at the time of the web paper WP being transported normally, and output signals corresponding to the degree of skew.

The inkjet printing apparatus 3 includes a controller 27. The controller 27 has a CPU and memory not shown, and has an image processing unit 29. The controller 27 receives from an external computer (not shown) print data which is data of images to be recorded on the web paper WP, and controls transportation of the web paper WP based on the print data.

The image processing unit 29 includes a recording position acquirer 31, a positional deviation amount calculator 33 a positional deviation interpolation image converter 35, a weighting coefficient storage unit 37 and a halftone dot processor 39.

The recording position acquirer 31 acquires a recording position of each image printed by each print head 19 based on the print data received by the controller 27. The positional deviation amount calculator 33 determines a degree of skew based on the signals from the first sensor 23 and second sensor 25, and calculates an amount of deviation of the recording position of each image in each print head 19. The positional deviation interpolation image converter 35, when there is a remainder between a deviation amount and predetermined interval L, converts each image into a positional deviation interpolation image by shifting each image in the direction of skew by means of a weighting corresponding to the remainder. Along with the above, the positional deviation interpolation image converter 35, even when there is no remainder between a deviation amount and predetermined interval L, converts each image adjacent an image having a remainder between a deviation amount and predetermined interval L into a positional deviation interpolation image by shifting each image in the direction of skew by means of a smaller weighting than the weighting corresponding to the remainder between a deviation amount and predetermined interval L.

The weighting coefficient storage unit 37 stores beforehand weighting coefficients used when the positional deviation interpolation image converter 35 carries out conversions. The weighting coefficients are stored in a lookup table form, for example. The halftone dot processor 39 performs a halftone dot process on positional deviation interpolation images, and outputs each positional deviation interpolation image having undergone the halftone dot process to each print head 19 for printing on the web paper WP.

The image processing unit 29 determines occurrence of a skew based on the outputs of the first sensor 23 and second sensor 25. When there is no remainder between a shift amount and predetermined interval L and when each image does not adjoin an image with a remainder, no conversion to a positional deviation interpolation image is done by the positional deviation interpolation image converter 35. In this case, each image is only converted into a positional deviation image so that ink is dispensed from other inkjet nozzles 20 according to a deviation amount.

The above image processing unit 29 corresponds to the "image processing apparatus" in this invention. The recording position acquirer 31 corresponds to the "recording position acquiring device" in this invention. The positional deviation amount calculator 33 corresponds to the "positional deviation amount calculating device" in this invention. The positional deviation interpolation image converter 35 corresponds to the "positional deviation interpolation image converting device" in this invention. The halftone dot processor 39 corresponds to the "halftone dot processing device" in this invention.

A positional deviation due to a skew will now be described with reference to FIGS. 2 and 3. FIG. 2 is a schematic plan view showing a positional relationship of each print head and sensors. FIG. 3 is a view illustrating a positional deviation in a width direction due to a skew. To facilitate understanding of the invention, the following description will be made taking for example only two print heads 19, i.e. the print head 19a and second print head 19b.

When no skew occurs to the web paper WP, the side end of the web paper WP moves along a reference line RL (Y-axis) on the transport path. However, when a skew occurs to the web paper WP, the web paper WP has its side end surface move along a skew line GL inclined from the reference line RL in a direction perpendicular to the transport direction, for example. Assume here that an X-axis is a line extending perpendicular to the transport direction and longitudinally of the most upstream print head 19a. This X-axis is perpendicular to the Y-axis in a level plane.

Description will be made here, by way of example, about the case where a deviation amount at the second print head 19b (corresponding to the "target print head") relative to the print head 19a (corresponding to the "reference print head") is MD. This deviation amount MD represents a case, for example, where a reference image FG1 is printed by the print head 19a, and a target image FG2 is printed by the second print head 19b downstream thereof, these images being print data overlapping each other in the same position unless there occurs a skew, but the target image FG2 is printed as deviating from the reference image FG1 according to an amount of skew in the direction perpendicular to the transport direction. At this time, the deviation amount in the direction perpendicular to the transport direction of the target image FG2 relative to the reference image FG1 is MD as shown in FIG. 3.

This deviation amount MD is calculated by the deviation amount calculating unit 33 noted hereinbefore based, for example, on the positional relationships between the first sensor 23 and second sensor 25 and between the print head 19a and print head 19b. When this deviation amount MD is divisible by the predetermined interval L, or when the deviation amount MD is an integral multiple of the predetermined interval L, or in other words, when the deviation amount MD is divided by the predetermined interval L without leaving a remainder, the positional deviation interpolation image converter 35 does not convert the print data into a positional deviation interpolation image, but creates a positional deviation image by shifting the print data in the direction of the skew in units of the inkjet nozzles 20 (pixel-by-pixel unit which is the recording limit) according to the deviation amount MD. When, on the other hand, the deviation amount MD is indivisible by the predetermined interval L, or when the deviation amount MD is not an integral multiple of the predetermined interval L, or in other words, when the deviation amount MD is divided by the predetermined interval L but leaves a remainder, the positional deviation interpolation image converter 35 converts the print data into a positional deviation interpolation image shifted in the direction of the skew by applying a weighting according to the remainder as described hereinafter. However, even when the above remainder is not produced, the positional deviation interpolation image converter 35 converts an image adjacent an image having a remainder between deviation amount MD and predetermined interval L into a positional deviation interpolation image shifted in the direction of the skew by means of a smaller weighting than the above weighting.

Figure 4:
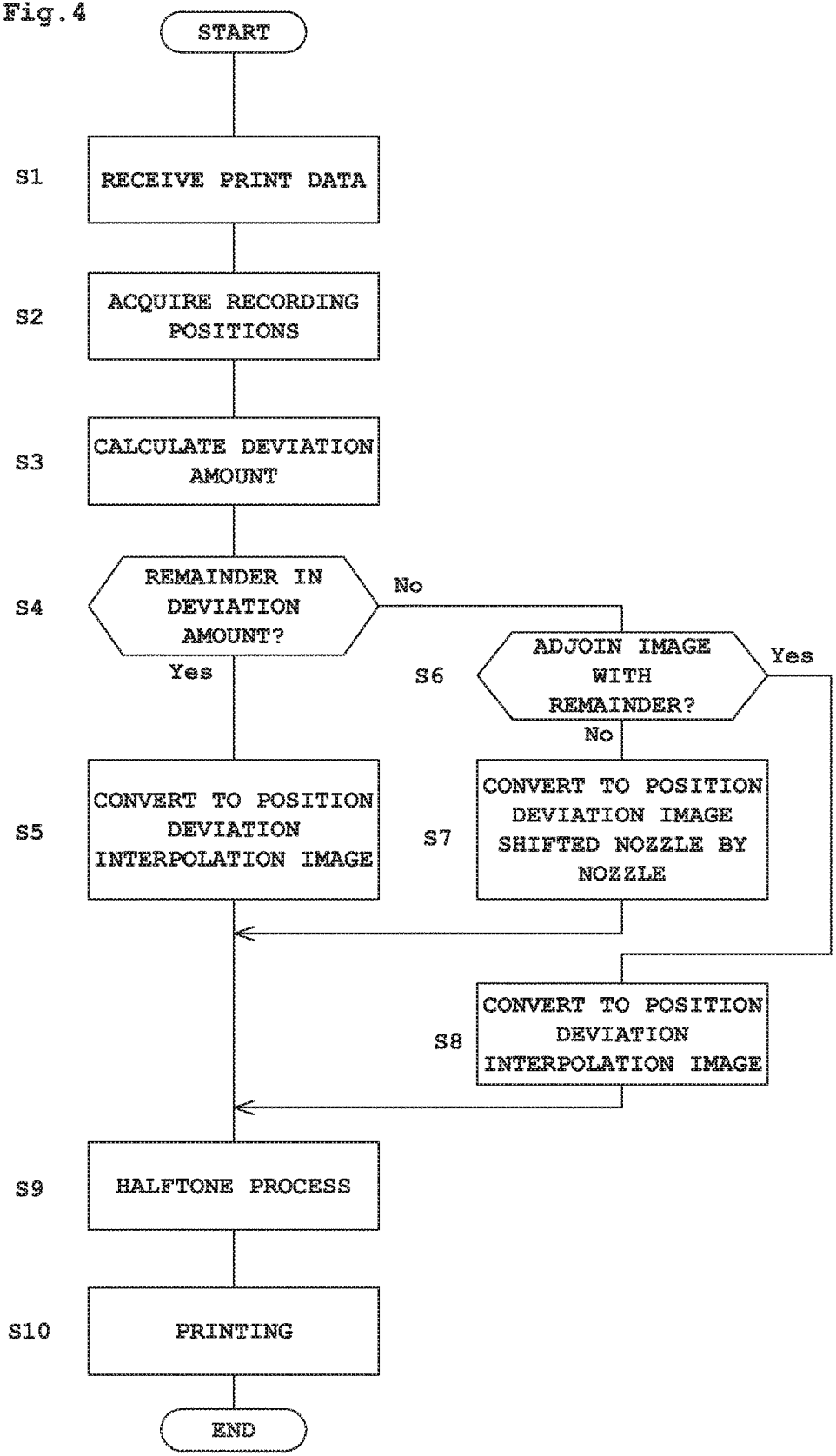
FIG. 4 is a flow chart of a printing process.

A printing operation by the above inkjet printing apparatus 3 will be described with reference to FIG. 4. FIG. 4 is a flow chart of a printing process.

Step S1

The controller 27 receives print data from the external computer.

Step S2 (Recording Position Acquiring Process)

The recording position acquirer 31 acquires recording positions of a reference image and a target image which are printed by the print head 19a and print head 19b based on the print data.

Step S3 (Position Deviation Amount Calculating Process)

The positional deviation calculator 33, based on the output signals of the first sensor 23 and second sensor 25, calculates a deviation amount MD of the recording positions of the image data printed by the print head 19a and print head 19b.

Step S4

The positional deviation interpolation image converter 35 branches the process by whether there is any remainder between the deviation amount MD and predetermined interval L. When there is a remainder, the process branches to step S5. When there is no remainder, the process branches to step S6.

Step S5 (Positional Deviation Interpolation Image Conversion Process)

When there is a remainder, the positional deviation interpolation image converter 35 cannot appropriately make a correction even by shifting in units of inkjet nozzles 20, i.e. pixel by pixel. So, the positional deviation interpolation image converter 35 converts the target image printed by the print head 19b into a positional deviation interpolation image, for example, by performing an interpolation process with a weighting based on the deviation amount MD (details described hereinafter).

Step S6

The process is branched by whether the image adjoins an image with a remainder between the deviation amount MD and predetermined interval L. Specifically, when the image does not adjoin the latter image, the process branches to step S7, and when it does, the process branches to step S8.

Step S7

The positional deviation interpolation image converter 35 creates a positional deviation image by shifting the target image printed by the print head 19b in units of the inkjet nozzles 20.

Step S8

When the target image adjoins an image with a remainder, the positional deviation interpolation image converter 35 converts it into a positional deviation interpolation image through an interpolation process with a weighting smaller than the weighting in step S5 (details described hereinafter).

Step S9

The halftone dot processor 39 performs a halftone dot process on the reference image and target image (positional deviation interpolation image or positional deviation image).

Step S10

The controller 27 causes the printing unit 13 to print the reference image and target image having undergone the halftone dot process.

Figure 5:
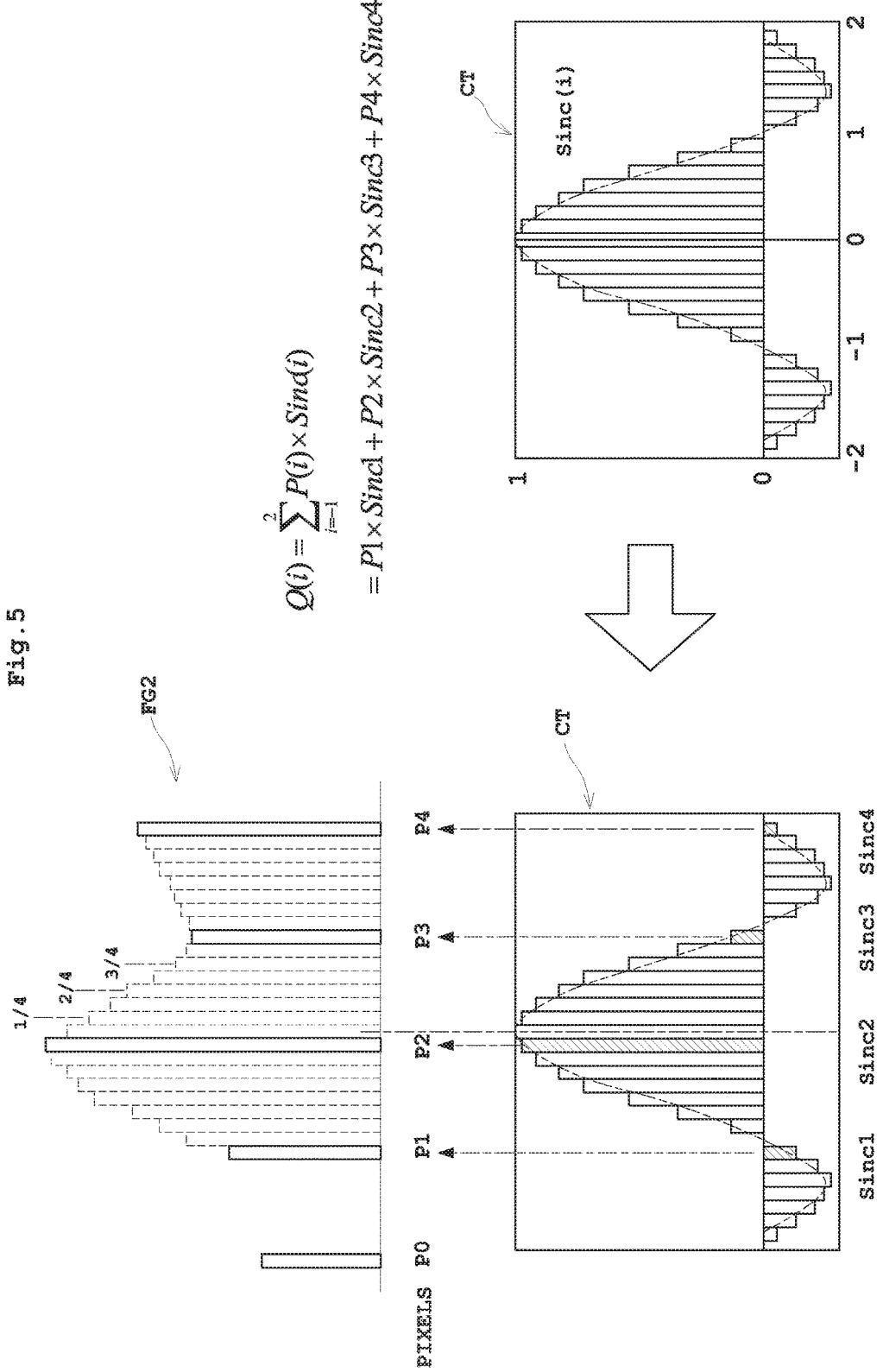
FIG. 5 is a schematic view illustrating a weighting process with a Sin c function.
Figure 6:
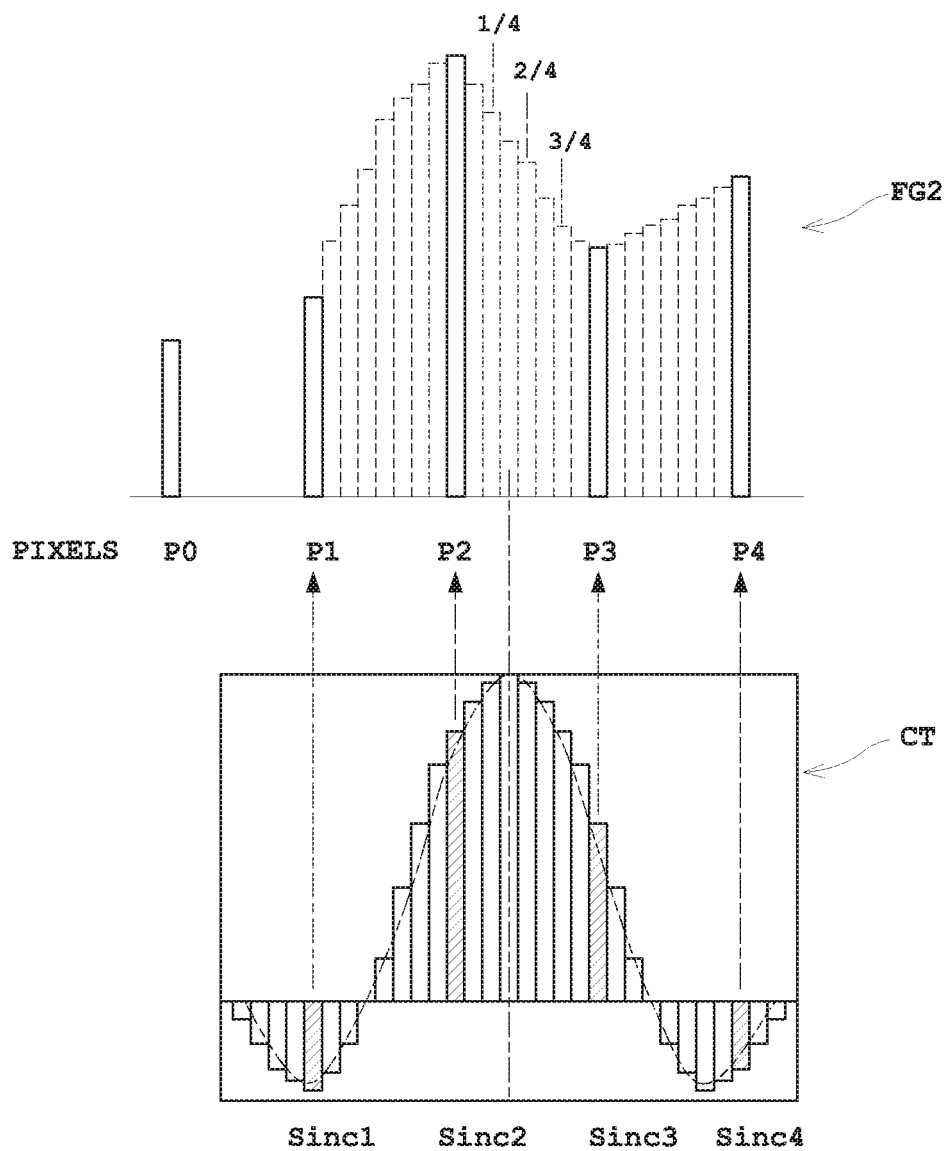
FIG. 6 is a schematic view showing a specific example of weighting process with the Sin c function.
Figure 7:
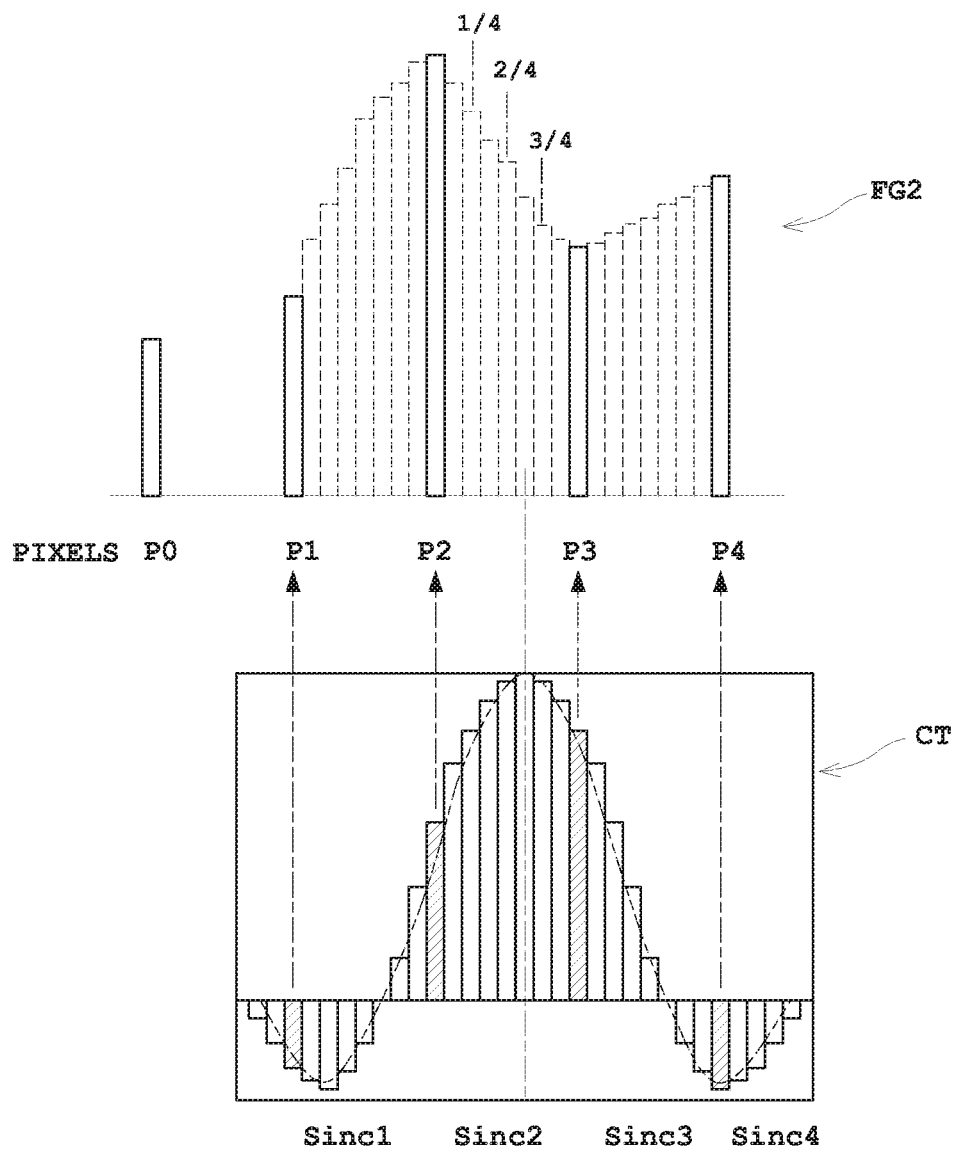
FIG. 7 is a schematic view showing another specific example of weighting process with the Sin c function.
Figure 8:
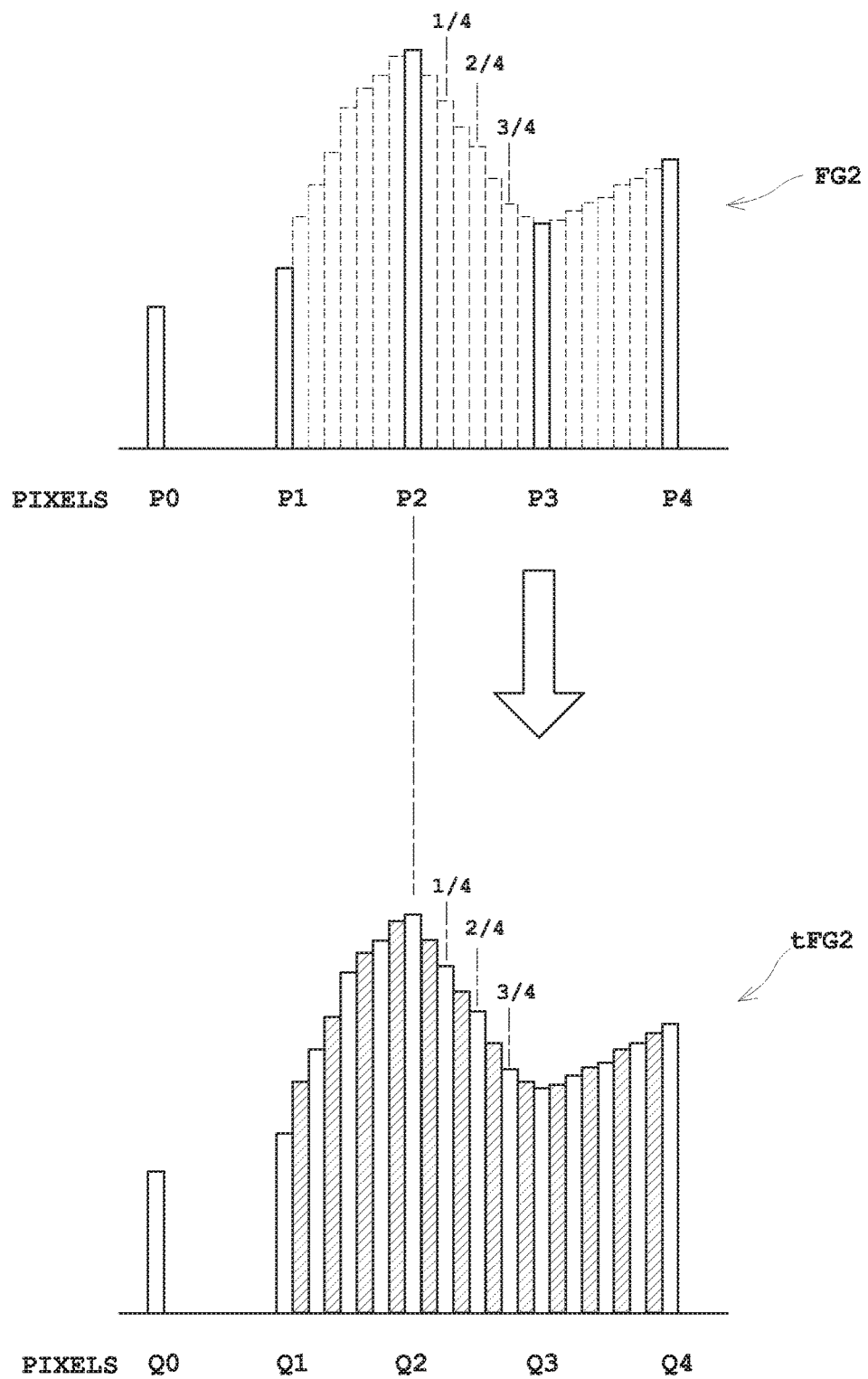
FIG. 8 is a schematic view showing an image based on real data and a converted positional deviation interpolation image.

The weighting process and small weighting process noted above will now be described with reference to FIGS. 5-8. FIG. 5 is a schematic view illustrating a weighting process with a Sin c function. FIGS. 6 and 7 are schematic views showing specific examples of weighting process with the Sin c function. FIG. 8 is a schematic view showing an image based on real data and a converted positional deviation interpolation image.

The positional deviation image converter 35, when there is a remainder between the deviation amount MD and predetermined interval L, as described above, converts the target image FG2 of the print data into a positional deviation interpolation image, for example. The target image FG2 has real data at every predetermined interval L. Weighting coefficients CT are cubic Sin c functions, for example. These Sin c functions, as having a finite length with a window whose minimum is minus and maximum is 1, are stored beforehand in a lookup table form in the weighting coefficient storage unit 37. Preferably, a weighting coefficient CT is determined and stored for each remainder. Here, an interval between pixels is divided into eight parts as a predetermined number of divisions, for example, and the weighting coefficient CT is stored for a remainder corresponding to each ⅛ unit of the predetermined interval L.

The positional deviation interpolation image converter 35, with respect to the target image FG2 which is the image to be shifted, and with respect to pixel values of a range corresponding to the pixel values of one pixel and four adjacent pixels, applies the weighting coefficient CT to a position shifted by the remainder and further by a position of a minimum unit of the predetermined number of divisions from the one pixel value of the target image. This corresponds to the "weighting". Specifically, when the remainder is ¼ as shown in FIG. 6, the weighting coefficient CT is applied to the position of ⅜ which is shifted ⅛ in the direction of deviation amount from ¼. When the remainder is ½ as shown in FIG. 7, the weighting coefficient CT is applied to a position of ⅝ which is shifted by ⅛ in the direction of deviation amount ½. Similarly, when the remainder is ¾, although not shown, the weighting coefficient CT is applied to a position of ⅞ which is shifted by ⅛ in the direction of deviation amount from ¾.

The positional deviation interpolation image converter 35, when an image essentially not shifted adjoins an image to be shifted, applies the weighting coefficient CT to a position shifted by a position of a minimum unit of the predetermined number of divisions from the one pixel value of the target image. This corresponds to the "small weighting". That is, as shown in FIG. 5, the weighting coefficient CT is applied to a position shifted by ⅛ in the direction of deviation amount from 0.

As in the following equation, by calculating a sum of products of pixels P(i): P1-P4 of the target image FG2 and the shifted Sin c function in agreement regarding position, for example, the pixel value of the position of pixel P2+¼+⅛ can be interpolated as Q(i): Q1-Q4.

$$Q(i) = \Sigma(I = -1 \sim 2) P(i) \times \text{Sinc}(i)$$
$$= P1 \times \text{Sinc}1 + P2 \times \text{Sinc}2 + P3 \times \text{Sinc}3 + P4 \times \text{Sinc}4$$

In this way, the target image FG2 is converted into a positional deviation interpolation image tFG2 (FIG. 8). This can cope with the case where the deviation amount MD is not an integral multiple of the predetermined interval L but has shifts of ¼, 2/4 and ¾ of the predetermined interval L. Therefore, apparent positional deviations can fully be inhibited whatever the amount of skew. Moreover, since the ⅛ weighting is carried out including the case of an image not to be shifted but adjoining an image to be shifted, boundaries are made inconspicuous as described hereinafter, and a lowering of print quality can be inhibited even when a positional deviation interpolation image is used.

However, since the inkjet nozzles 20 have larger predetermined intervals L than the minimum unit ⅛ of the predetermined number of divisions between the pixels, the positional deviation interpolation image tFG2 as it is cannot be printed appropriately. So, the following process is performed by the halftone dot processor 39. Since it is difficult to depict variations of minute pixel values including the shifts of ⅛ unit, the following halftone dot process will be described taking the case of interpolation by ¼ unit for example.

Figure 10A:
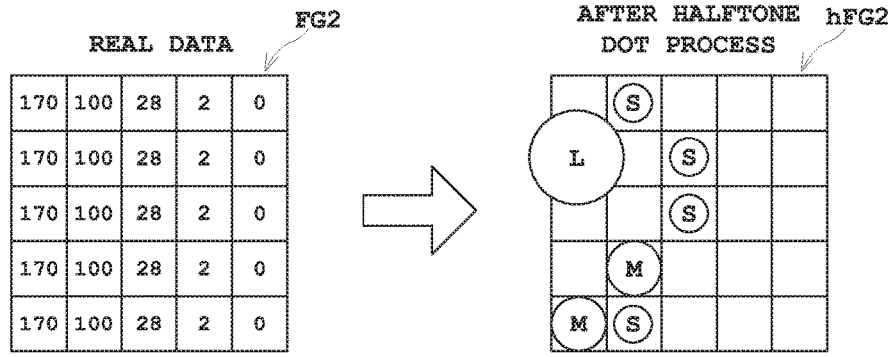
FIG. 10A is a schematic view showing the real data image and an image after the halftone dot process.
Figure 10B:
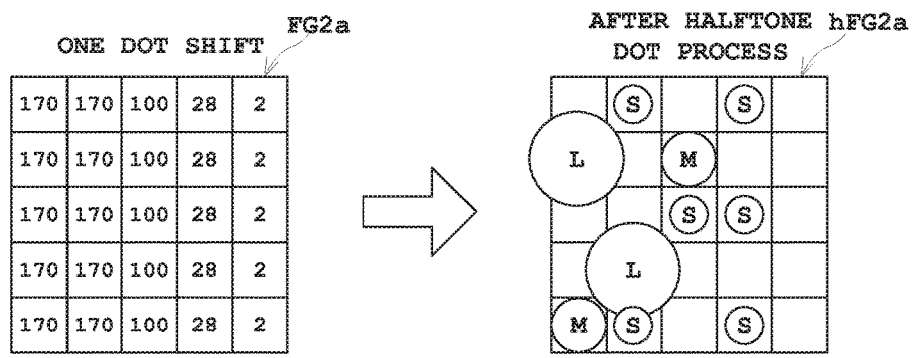
FIG. 10B is a schematic view showing a positional deviation interpolation image resulting from a one-dot shifting of the real data image and an image after the halftone dot process.
Figure 10C:
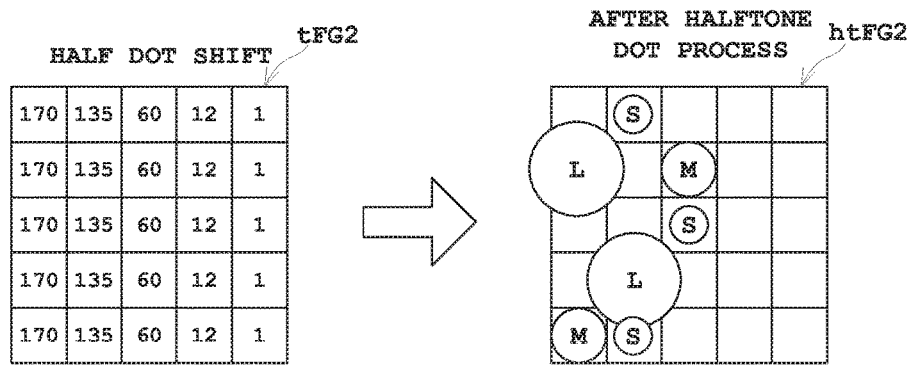
FIG. 10C is a schematic view showing a positional deviation interpolation image resulting from a half-dot shifting of the real data image and an image after the halftone dot process.

Reference is made to FIGS. 9 and 10A-10C. To facilitate understanding of the invention, description will be made on the assumption that the deviation amount MD is ½ here. FIG. 9 is a view illustrating a halftone dot process performed on a real data image. FIG. 10A is a schematic view showing the real data image and an image after the halftone dot process. FIG. 10B is a schematic view showing a positional deviation interpolation image resulting from a one-dot shifting of the real data image and an image after the halftone dot process. FIG. 10C is a schematic view showing a positional deviation interpolation image resulting from a half-dot shifting of the real data image and an image after the halftone dot process. It is assumed in this embodiment that the print heads 19 dispense three types of ink droplets, i.e. large droplets, medium droplets smaller than the large droplets, and small droplets smaller than the medium droplets.

Assume that FIG. 9 shows large droplet size halftone data, medium droplet size halftone data, small droplet size halftone data and the pixel values of real data (of the target image FG2 here). Of the various halftone data, the large droplet size halftone data is given priority in processing. In this case, of the pixel values in the real data of the target image FG2, the large droplets are applied to the pixels larger than the numerical value of the large droplet size halftone data. Next, processing is done in the order of medium droplet size halftone data and the small droplet size halftone data. Then, a half-toned target image hFG2 is created.

FIG. 10 shows arrangements of the various real data and the data after the halftone dot process. FIG. 10A shows the target image FG2 and the target image hFG2 after the halftone dot process. FIG. 10B shows a target image FG2*a* which does not adjoin an image without a remainder but is shifted by one dot, and a target image hFG2*a* after the halftone dot process. FIG. 10C shows the positional deviation interpolation image tFG2 of the target image FG2 shifted by ½ dot, and a positional deviation interpolation image htFG2 after the halftone dot process.

It is seen that the target image FG2*a* (FIG. 10B) shifted by one dot is greatly shifted to the right relative to the target image hFG2 (FIG. 10A) after the halftone dot process, whose position is not shifted. It is seen that the target image htFG2 (FIG. 10C) after the halftone dot process shifted by ½ dot has sensuously obtained a shift intermediate between the target image hFG2 (FIG. 10A) after the halftone dot process, whose position is not shifted, and the target image FG2*a* (FIG. 10B) shifted by one dot.

Reference is now made to FIGS. 11A-11B. FIGS. 11A-11B are schematic views of positional deviation interpolation images, in which FIG. 11A shows this embodiment, and FIG. 11B shows a reference example. The reference example is taken from Japanese patent application No. 2014-183480 in the name of Applicant herein. This reference example carries out a weighting according to a remainder between a deviation amount and predetermined interval L as does this embodiment, but does not carry out a small weighting for an image without a remainder which adjoins an image with a remainder. In the weighting, it is only the weighting according to the remainder, and a weight increase corresponding to the small weighting is not carried out. It is seen therefore that this embodiment (FIG. 11A) is notably different from the reference example (FIG. 11B) in that weighting is added, also in 0 and 1, to the pixel values in the direction of deviation amount.

Reference is made to FIGS. 12A-12B. FIGS. 12A-12B show examples of printing result, in which FIG. 12A shows this embodiment, and FIG. 12B shows a reference example.

In the case of this embodiment (FIG. 12A), the pixel values change smoothly across the boundaries between ¼ and ¾ with remainders and 0 and 1 adjacent thereto and without remainders. Therefore, the boundaries are inconspicuous. In the case of the reference example (FIG. 12B), on the other hand, the difference in pixel value is conspicuous across the boundaries between ¼ and ¾ with remainders and 0 and 1 adjacent thereto and without remainders. Therefore, the boundaries are conspicuous. It is seen therefore that, in this embodiment, a lowering of print quality can be inhibited even when a positional deviation interpolation image is used.

Reference is made to FIGS. 13A-13C. FIGS. 13A-13C are graphs showing variations of pixel values in images of no-shift real data and in images of various shift amounts, in which FIG. 13A shows this embodiment, FIG. 13B shows an example of exponential function, and FIG. 13C shows a reference example.

It is seen from these graphs that, in this embodiment (FIG. 13A), there occurs a reduced difference in pixel value between shift ⅜ (corresponding to shift ¼ in FIG. 13C) which produces a positional deviation interpolation image based on a remainder, and adjoining shift ⅛ (corresponding to shift 0/4 in FIG. 13C) which produces a positional deviation interpolation image with a small weighting. In the reference example (FIG. 13C), on the other hand, the difference in pixel value therebetween them is large, which confirms that the above boundary difference in FIG. 12B is conspicuous.

Figure 15:
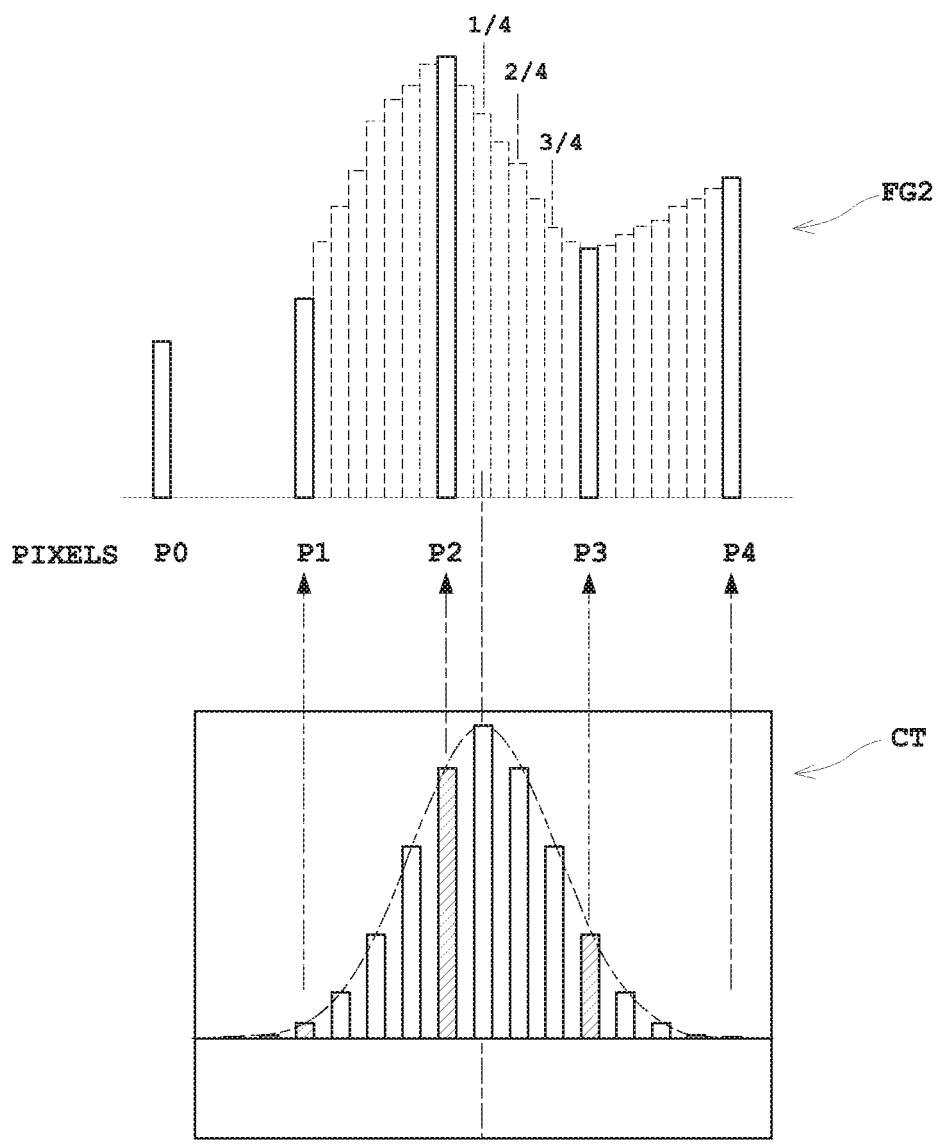
FIG. 15 is a schematic view showing a specific example of weighting process with the exponential function.
Figure 16:
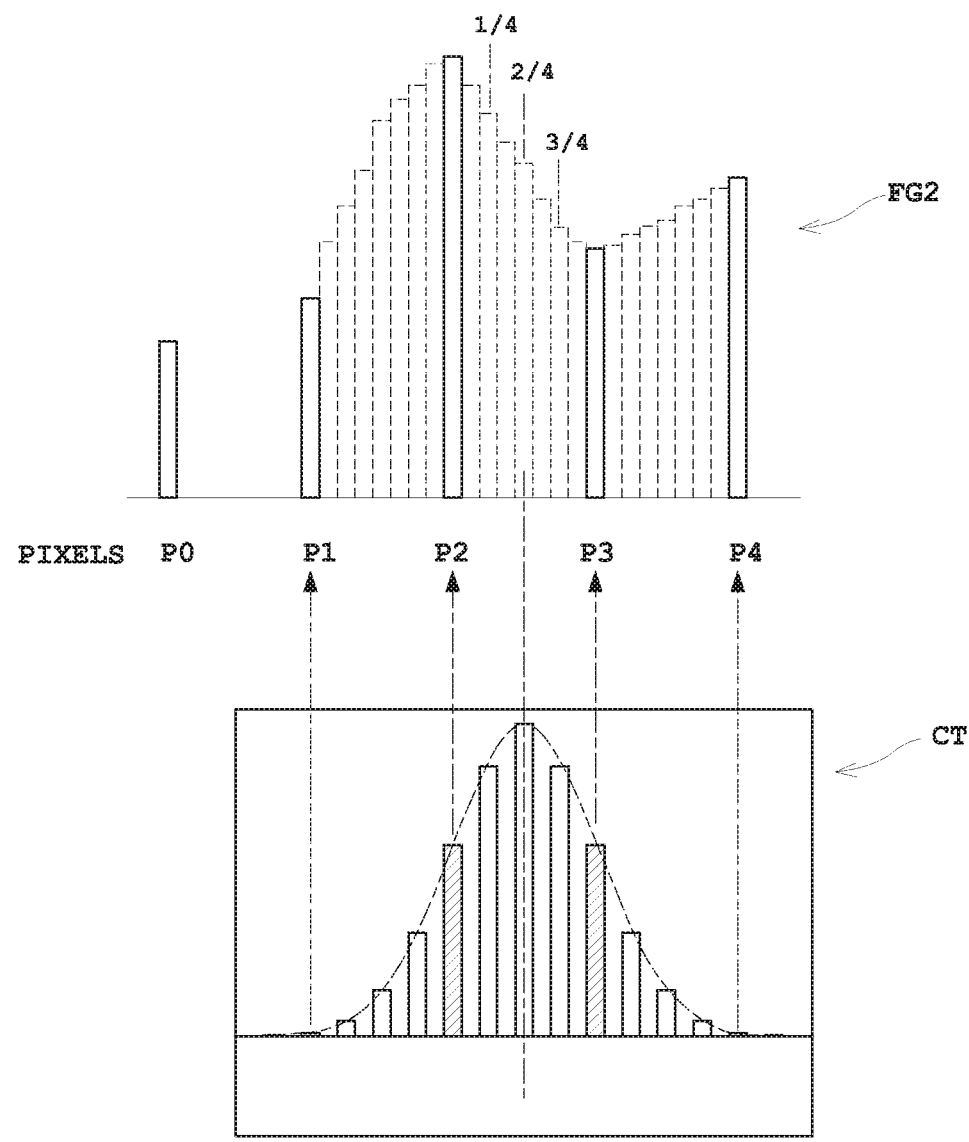
FIG. 16 is a schematic view showing another specific example of weighting process with the exponential function.

In the foregoing embodiment the weighting coefficient CT is Sin c function, but an exponential function may be employed instead. Reference is now made to FIGS. 14-16. FIG. 14 is a schematic view illustrating a weighting process with an exponential function. FIGS. 15 and 16 are schematic views showing specific examples of weighting process with the exponential function.

The exponential function is a general-purpose gauss window function as shown in FIG. 14, for example, and $\mu=0$ and $r=0.5$ are used. Exponential functions, as having a finite length with a window whose minimum is 0 and maximum is less than 1, are stored beforehand in a lookup table form in the weighting coefficient storage unit 37. Preferably, a weighting coefficient CT is determined and stored for each remainder, as in the case of Sin c function described hereinbefore.

The positional deviation interpolation image converter 35, about the target image FG2 which is the image to be shifted, and about pixel values of a range corresponding to the pixel values of one pixel and four adjacent pixels, applies the weighting coefficient CT to the position of one pixel value of the target image. This corresponds to the "weighting". Specifically, when the remainder is ¼ as shown in FIG. 15, the weighting coefficient CT is applied as it is to the position of ¼. When the remainder is ½ as shown in FIG. 16, the weighting coefficient CT is applied as it is to the position of ½. Similarly, when the remainder is ¾, although not shown, the weighting coefficient CT is applied to the position of ¾.

The positional deviation interpolation image converter 35, when an image essentially not shifted adjoins an image to be shifted, applies the weighting coefficient CT to the position of one pixel of the target image. This corresponds to the "small weighting". That is, as shown in FIG. 14, the weighting coefficient CT is applied to the position of 0. This is because the fact that the coefficient of the exponential function is less than one at maximum makes it unnecessary to make a shift by the position of the minimum unit of the number of divisions as done in the case of Sin c function described hereinbefore.

It is seen that, when this exponential function is used, as shown in FIG. 13B, there occurs a reduced difference in pixel value between shift ¼ which produces a positional deviation interpolation image based on a remainder, and adjoining shift 0/4 which produces a positional deviation interpolation image with a small weighting.

Figure 17:
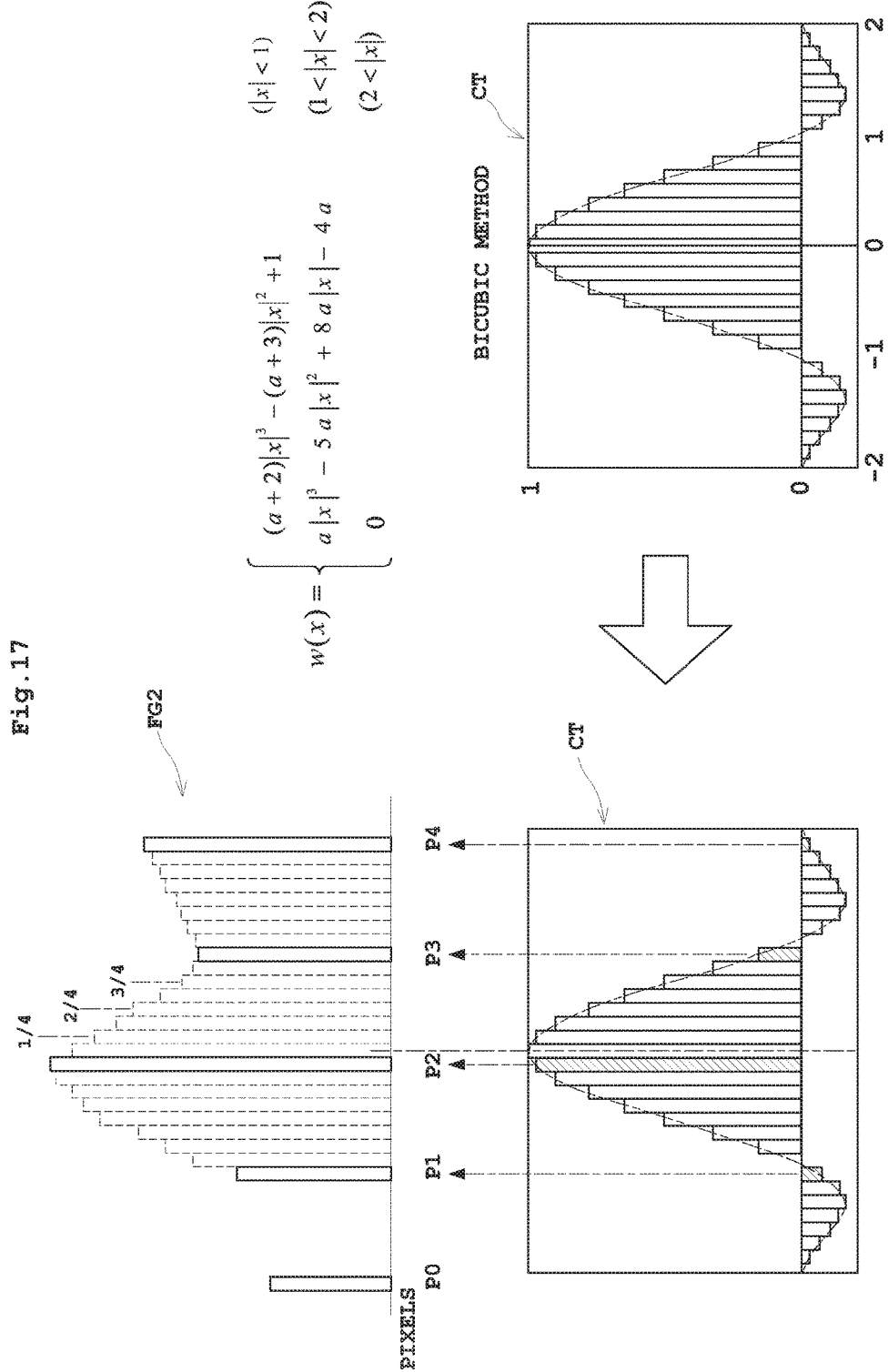
FIG. 17 is a schematic view illustrating a weighting process with a bicubic function.

Further, the weighting coefficient CT may be obtained by bicubic method. Reference is made to FIG. 17.

The bicubic method uses an operational expression as shown in FIG. 17, for example. These functions, as having a finite length with a window whose minimum is minus and maximum is 1, are stored beforehand in a lookup table form in the weighting coefficient storage unit 37. In this case, the weighting and small weighting may be carried out by the same technique as in the case of Sin c function described hereinbefore.

Figure 18:
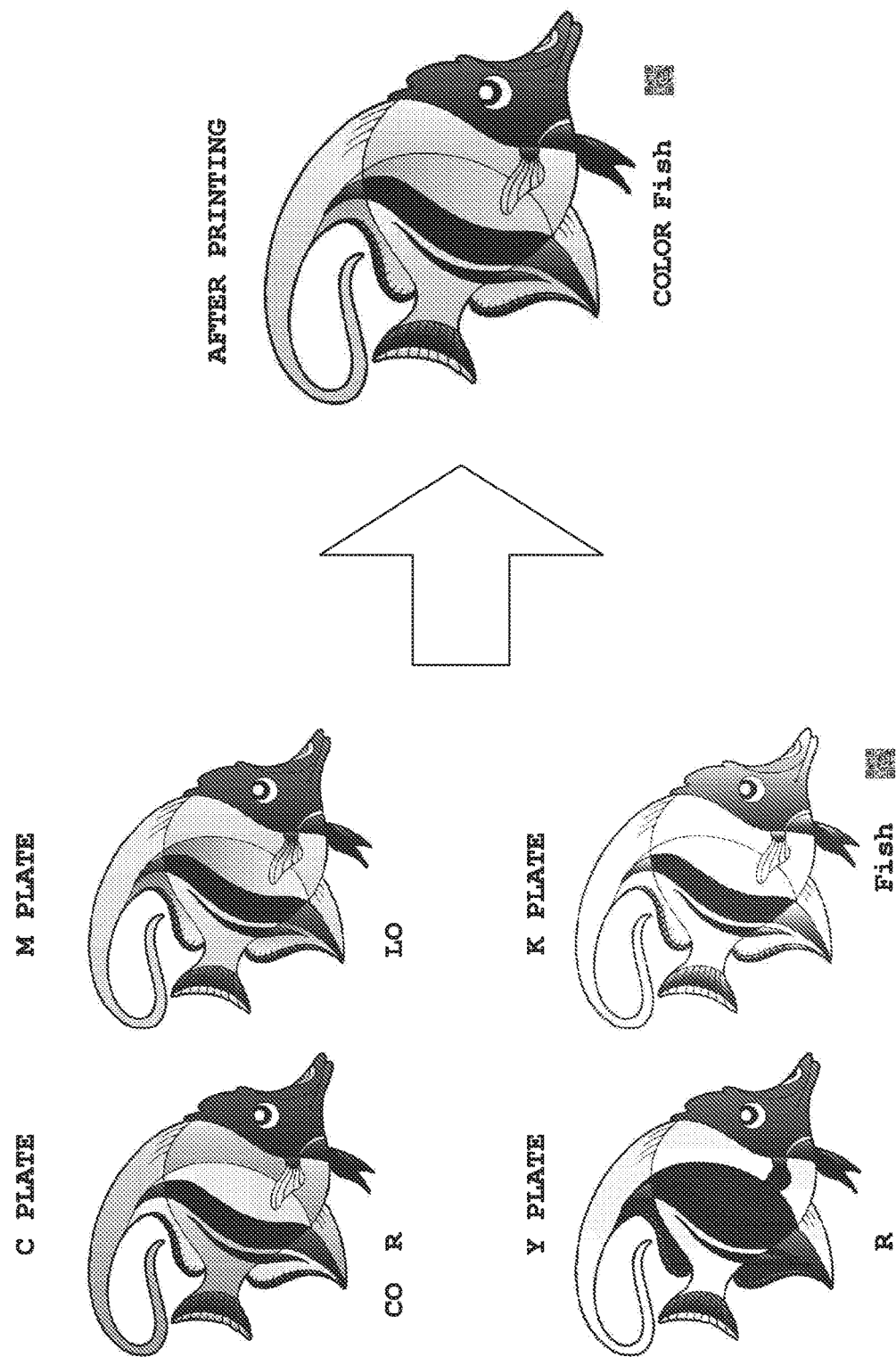
FIG. 18 is a schematic view showing an example of printing real data consisting of four plates of CMYK.

Reference is now made to FIG. 18. FIG. 18 is a schematic view showing an example of printing real data consisting of four plates of CMYK. It is assumed here that the data includes a C plate providing a pattern of a fish, CO and R, an M plate providing a pattern of the fish and LO, a Y plate providing a pattern of the fish and R, and a K plate providing a pattern of the fish, Fish and a QR code (registered trademark).

Preferably, the above printing process is applied to the print data consisting of the four CMYK plates as follows.

When the print data consists of CMYK, the image processing unit 29 extracts a line drawing area in each plate. And even when the line drawing area has a remainder between the deviation amount MD and predetermined interval L, the positional deviation interpolation image converter 35 does not create a positional deviation interpolation image. The line drawing area refers to characters such as "COLOR Fish" and codes such as the QR code (registered trademark) in FIG. 18, for example.

Figure 19:
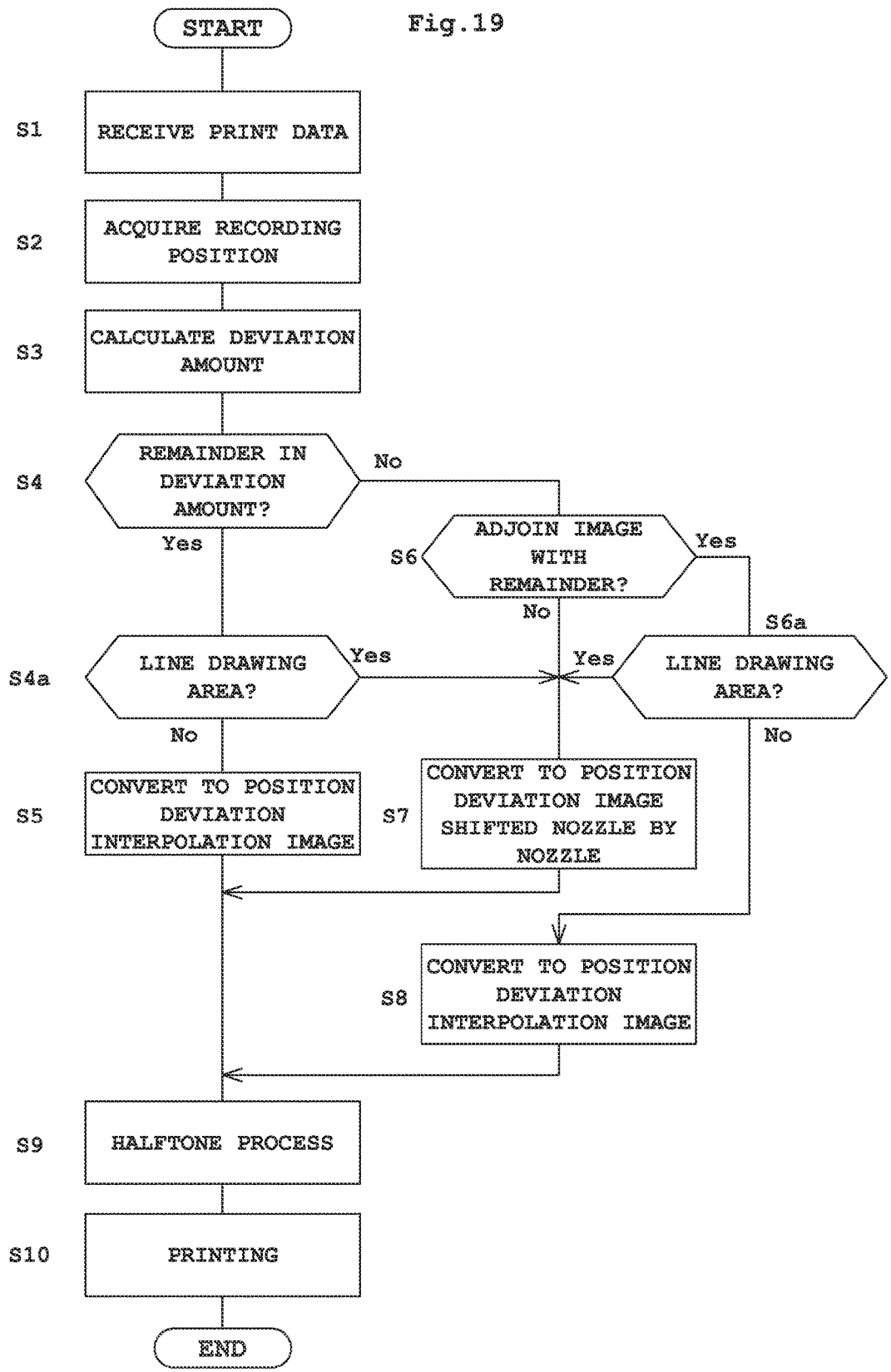
FIG. 19 is a flow chart showing an example of printing real data including line drawing areas.

A specific flow of the printing process is as shown in FIG. 19. FIG. 19 is a flow chart showing an example of printing real data including line drawing areas.

A rough flow of the process is similar to that of FIG. 4 described hereinbefore. The difference lies in step S4a and step S6a which determine presence or absence of a line drawing area. When a line drawing area is found in these steps S4a and S6a, only conversion to a positional deviation correction image in units of the nozzles is carried out whether there is a remainder in the amount of deviation or whether the image adjoins an image having a remainder in the amount of deviation.

By not converting such a line drawing area to a positional deviation interpolation image as an exceptional measure, it can prevent a blurring of outlines and becoming indistinct as line drawing due to the conversion to a positional deviation interpolation image. The line drawings can therefore be recognized reliably.

Figure 20:
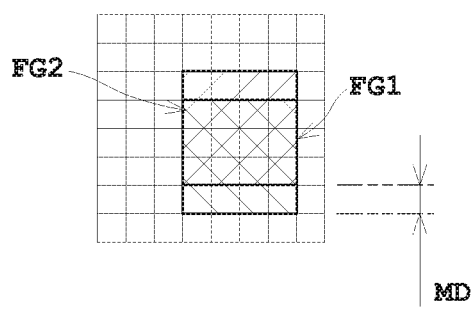
FIG. 20 is a view illustrating a positional deviation in a transport direction due to a rotary encoder.

A positional deviation in the direction perpendicular to the transport direction of web paper WP is corrected in the foregoing embodiment. This invention is applicable also to a positional deviation in the transport direction. Reference is now made to FIG. 20. FIG. 20 is a view illustrating a positional deviation in the transport direction due to the rotary encoder.

As shown in FIG. 1, the inkjet printing apparatus 3 does printing while transporting the web paper WP with the drive rollers 7 and 11. For example, the controller 27 controls rotation of the drive rollers 7 and 11 to attain a transporting speed of printing conditions. The controller 27 controls dispensation timing of ink droplets from each of the print heads 19a-19d based on the pulse signal from the rotary encoder 12 connected to the transport roller 9 disposed downstream of the drive roller 7 and upstream of the print head 19a, and the positional relationship of the print heads 19a-19d.

Incidentally, depending on the construction of the inkjet printing system, the transport roller 9 of the inkjet printing apparatus 3 may transport the web paper WP having undergone a drying process after being printed. Then, the transport roller 9 expands with the heat of the web paper WP to have an elongated circumference. Therefore, even if the transporting speed is constant, the pulse intervals outputted from the rotary encoder 12 will become long. The controller 27 therefore determines that the transporting speed has changed, and changes the dispensation timing of ink droplets from the print heads 19a-19d. Thus, the dispensation timing becomes inappropriate and causes a positional deviation in the transport direction.

Reference is now made to FIG. 20. FIG. 20 is a view illustrating a positional deviation in the transport direction due to the rotary encoder.

When, for example, the pulse intervals of the rotary encoder 12 become long due to expansion of the transport roller 9, the controller 27 determines that the web paper WP is transported behind time. The controller 27 delays the timing, for example, when the target image FG2 is printed by the print head 19b after the reference image FG1 is printed by the print head 19a. Then, since the transporting speed of the web paper WP is actually constant, the target image FG2 will be shifted by the deviation amount MD in the transport direction relative to the reference image FG1.

Even when such deviation amount MD occurs in the transport direction, the positional deviation amount calculating unit 33 calculates a deviation amount of the recording position of each image based on the variations in the pulse intervals of the rotary encoder 12. By carrying out the printing process described hereinafter according to the remainder between the calculated deviation amount MD and predetermined interval L in the transport direction of the inkjet nozzles 20, apparent positional deviations can fully be inhibited whatever the amount of deviation in the transport direction.

Specifically, the printing process may be carried out as shown in FIG. 21. FIG. 21 is a flow chart showing a printing process based on an amount of deviation in the transport direction.

A rough flow of the process is similar to that of FIG. 4 described hereinbefore. The difference lies in step S3a which calculates an amount of deviation in the transport direction. In this step S3a an amount of deviation in the transport direction is calculated which is due to variations in the pulse signal of the rotary encoder 29. And according to a remainder between this deviation amount and the predetermined interval in the transport direction of the inkjet nozzles 20, conversion is made into a positional deviation interpolation image or into a positional deviation image shifted in units of the nozzles. Even if there is no remainder, when the image adjoins an image with a remainder, it is the same as the process described hereinbefore to create a positional deviation interpolation image.

By carrying out the printing process in this way, apparent positional deviations can fully be inhibited whatever the amount of deviation in the transport direction. Of the images with no remainder which essentially do not need to be shifted, an image adjoining an image to which a weighting has been applied is converted into a positional deviation interpolation image with a small weighting. Consequently, boundaries are made inconspicuous, and a lowering of print quality can be inhibited even when the positional deviation interpolation image is used.

This invention is not limited to the foregoing embodiment, but may be modified as follows:

(1) In the foregoing embodiment, the target image FG2 is converted into a positional deviation interpolation image tFG2. However, the reference image FG1 may be made a positional deviation interpolation image tFG1 by shifting it to an opposite side to the direction of deviation amount MD.

(2) In the foregoing embodiment, the cubic Sin c function, exponential function, and bicubic method are used at the time of conversion into a positional deviation interpolation image, but this invention is not limited to these interpolating techniques.

(3) In the foregoing embodiment, when carrying out weighting, the process is performed for a range corresponding to one pixel value and four adjacent pixel values of the image to be shifted. This invention is not limited to this range. For example, if a load at the time of processing does not become a problem, the process may be performed for a range corresponding to five or more pixel values.

(4) The foregoing embodiment has been described taking the inkjet printing apparatus 3 for example. This invention is applicable also to printing apparatus of other printing modes having printing heads arranged as spaced from one another in the transport direction.

(5) In the foregoing embodiment, the web paper WP has been taken as an example of printing medium of the inkjet printing apparatus 3. This invention is not limited to the web paper WP as the printing medium, but is also applicable where the medium is film, for example.

This invention may be embodied in other specific forms without departing from the spirit or essential attributes thereof and, accordingly, reference should be made to the appended claims, rather than to the foregoing specification, as indicating the scope of the invention.

What is claimed is:

1. An image processing apparatus for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium and in the transport direction of the printing medium, the image processing apparatus comprising:

a pulse signal outputting device for outputting a pulse signal according to rotation of a transport roller rotatable with movement of the recording medium;

a recording position acquiring device for acquiring recording positions of a reference image printed by the reference print head and a target image printed by the target print head;

a positional deviation amount calculating device for calculating a deviation amount in the transport direction due to a variation of the pulse signal detected by the pulse signal outputting device with respect to the recording positions of the reference image and the target image acquired by the recording position acquiring device; and a positional deviation interpolation image converting device, when there is a remainder of the deviation amount and the predetermined intervals in the transport direction, for adding a weight based on the remainder to the reference image or the target image, and adding a smaller weight than said weight to the reference image or the target image without a remainder and adjoining the reference image or the target image with the remainder, thereby converting the image into a positional deviation interpolation image shifted according to the variation of the pulse signal.

2. The image processing apparatus according to claim 1, wherein the positional deviation interpolation image converting device uses a Sin c window function whose minimum value is minus and maximum value is 1 in an interval including a predetermined number of pixels of the reference image or the target image, divides an interval between the pixels of the reference image or the target image by a predetermined number of divisions, and adds the weight and the small weight after further shifting a center of the Sin c window function by a position of a minimum unit of the number of divisions from a position corresponding to the remainder.

3. The image processing apparatus according to claim 2, further comprising a halftone dot processing device for carrying out a halftone dot process according to shift amounts on the positional deviation interpolation image when outputting the positional deviation interpolation image to the printing unit.

4. The image processing apparatus according to claim 2, wherein the positional deviation interpolation image converting device does not convert line drawing areas of the reference image and the target image into positional deviation interpolation images.

5. The image processing apparatus according to claim 1, wherein the positional deviation interpolation image converting device uses an exponential window function whose minimum value is 0 and maximum value is less than 1 in an interval including a predetermined number of pixels of the reference image or the target image, divides an interval between the pixels of the reference image or the target image by a predetermined number of divisions, and adds the weight and the small weight after placing a center of the exponential window function in a position corresponding to the remainder.

6. The image processing apparatus according to claim 5, further comprising a halftone dot processing device for carrying out a halftone dot process according to shift amounts on the positional deviation interpolation image when outputting the positional deviation interpolation image to the printing unit.

7. The image processing apparatus according to claim 5, wherein the positional deviation interpolation image converting device does not convert line drawing areas of the reference image and the target image into positional deviation interpolation images.

8. The image processing apparatus according to claim 1, further comprising a halftone dot processing device for carrying out a halftone dot process according to shift amounts on the positional deviation interpolation image when outputting the positional deviation interpolation image to the printing unit.

9. The image processing apparatus according to claim 1, wherein the positional deviation interpolation image converting device does not convert line drawing areas of the reference image and the target image into positional deviation interpolation images.

10. An image processing method for a printing apparatus for printing on a printing medium with a printing unit including at least two print heads consisting of a reference print head for providing a reference for printing, and a target print head disposed as spaced from the reference print head in a transport direction for printing in accordance with printing by the reference print head, each print head having a plurality of recording elements arranged at predetermined intervals in a direction perpendicular to the transport direction of the printing medium and in the transport direction of the printing medium, the method comprising:

a pulse signal detecting step for detecting a pulse signal according to rotation of a transport roller rotatable with movement of the recording medium;

a recording position acquiring step for acquiring recording positions of a reference image printed by the reference print head and a target image printed by the target print head;

a positional deviation amount calculating step for calculating a deviation amount due to a variation of the pulse signal detected in the pulse signal detecting step with respect to the recording positions of the reference image and the target image acquired in the recording position acquiring step; and a positional deviation interpolation image converting step, when there is a remainder of the deviation amount and the predetermined intervals in the transport direction, for adding a weight based on the remainder to the reference image or the target image, and adding a smaller weight than said weight to the reference image or the target image without a remainder and adjoining the reference image or the target image with the remainder, thereby converting the image into a positional deviation interpolation image shifted according to the variation of the pulse signal.

\* \* \* \* \*